US006726509B2

(12) United States Patent  (10) Patent No.: US 6,726,509 B2
Milan  (45) Date of Patent: Apr. 27, 2004

(54) STACKABLE POWER SUPPLY SYSTEM

(76) Inventor: Henry Milan, 1709 Apple Ridge Ct., Rochester Hills, MI (US) 48306

( * ) Notice: Subject to any disclaimer, the term of this patent is extended or adjusted under 35 U.S.C. 154(b) by 0 days.

(21) Appl. No.: 10/214,534

(22) Filed: Aug. 8, 2002

(65) Prior Publication Data

US 2002/0193015 A1 Dec. 19, 2002

Related U.S. Application Data

(63) Continuation-in-part of application No. 09/730,030, filed on Dec. 5, 2000.
(60) Provisional application No. 60/169,055, filed on Dec. 6, 1999.

(51) Int. Cl.[7] .................................................. H01K 5/02
(52) U.S. Cl. ..................... 439/752.5; 439/284; 439/529
(58) Field of Search .............................. 439/752.5, 284, 439/286.92, 295, 529, 530, 540.1, 928, 928.1; 361/731, 732, 733, 735

(56) References Cited

U.S. PATENT DOCUMENTS

| | | | | |
|---|---|---|---|---|
| 4,501,460 A | * | 2/1985 | Sisler | ........................... 361/732 |
| 5,645,434 A | | 7/1997 | Leung | |
| 5,838,548 A | * | 11/1998 | Matz et al. | .................. 439/928 |
| 6,059,614 A | * | 5/2000 | Shelby et al. | ................ 361/735 |
| 6,137,686 A | * | 10/2000 | Saye | ........................... 361/732 |
| 6,141,221 A | | 10/2000 | Tong | |
| 6,304,188 B1 | * | 10/2001 | Subak et al. | ................. 361/731 |
| 6,462,953 B2 | | 10/2002 | Tong | |

* cited by examiner

Primary Examiner—Renee Luebke
(74) Attorney, Agent, or Firm—MacMillan Sobanski & Todd, LLC

(57) ABSTRACT

A modular stackable hub system that includes at least one stackable hub for communicating any combination of a multiplicity of electrical signals, for example, ISDN modems, port replication, USB to Ethernet, Ethernet switching, direct current, alternating current, routers, KVM switches, cable modem, firewire, DVD drives, CDRW drives, and USB. The stackable hub would include at least one upstream port and at least one downstream port for releasable mounting to other components in the stackable component system, and may include at least one external port and/or at least one bay for receiving a removable module. The upstream port would communicate upstream electrical signals, which may be any combination of the electrical signals, for example, the aforementioned electrical signals, with an upstream component, and may pass these electrical signals on to the downstream port, where a separate downstream component may be connected, and/or the external port. The removable module may, for example, be a surge protector. Consequently, any number of stackable hubs may be stacked together and releasably mounted to and communicating electrical signals with a base unit.

51 Claims, 20 Drawing Sheets

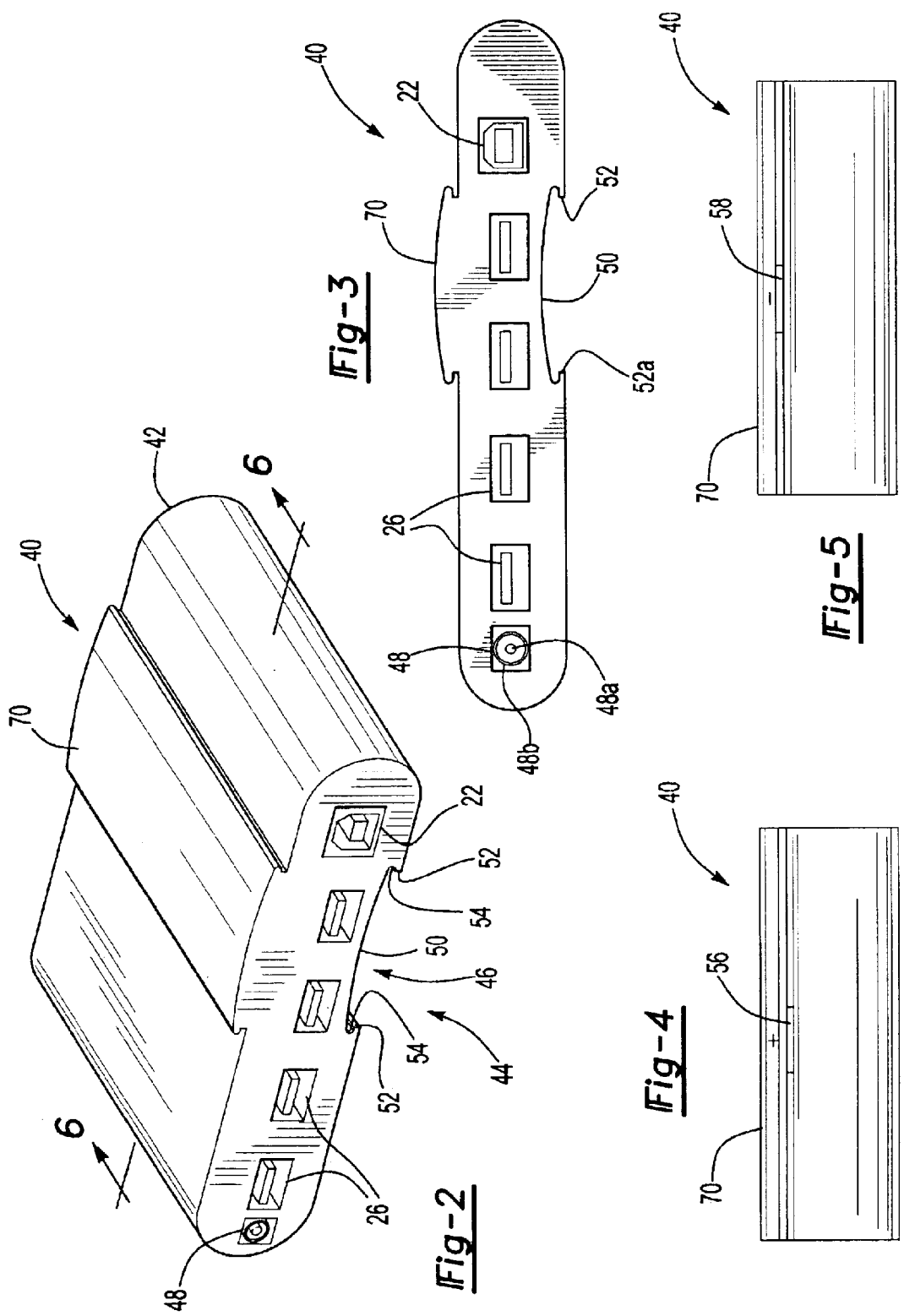

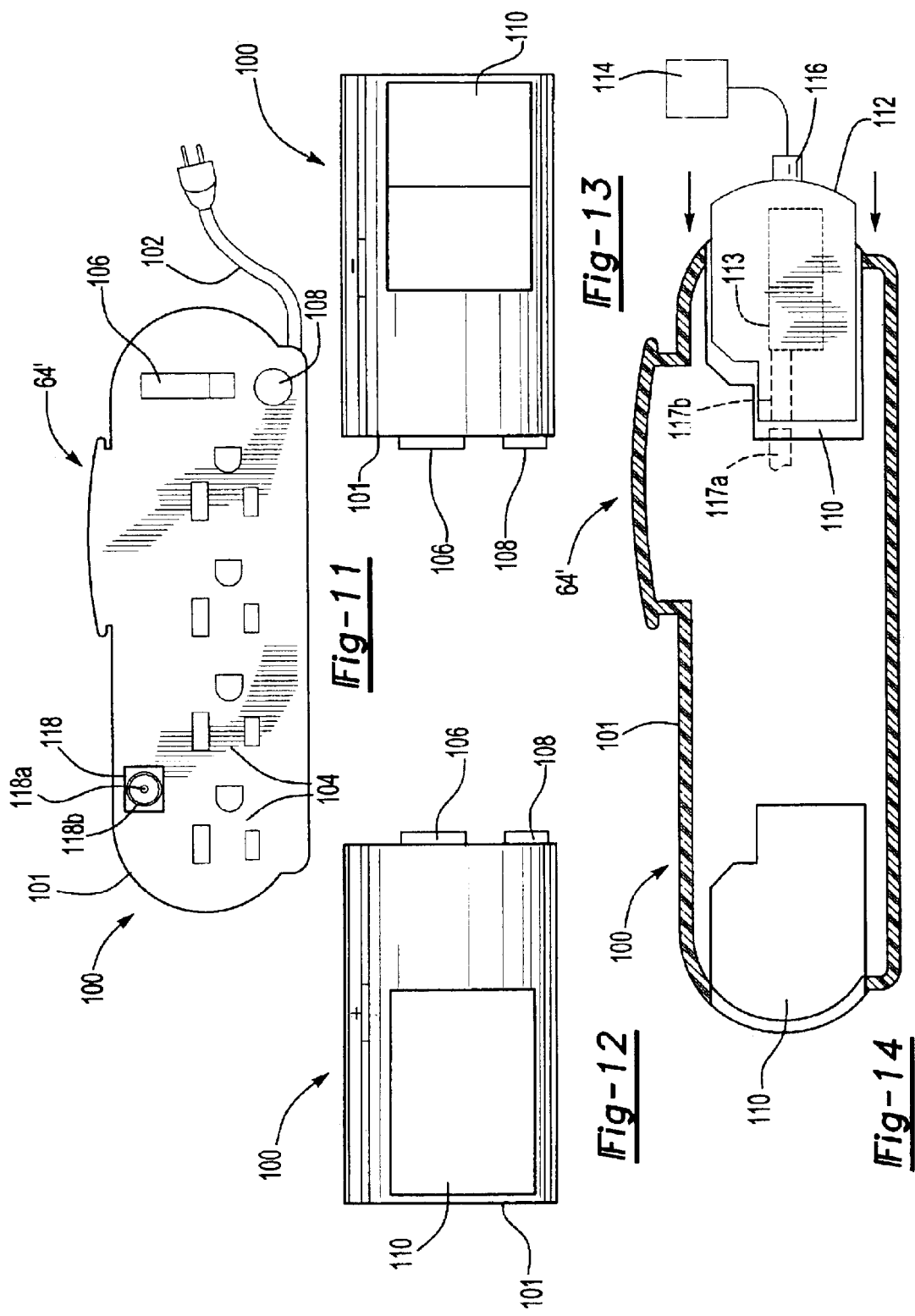

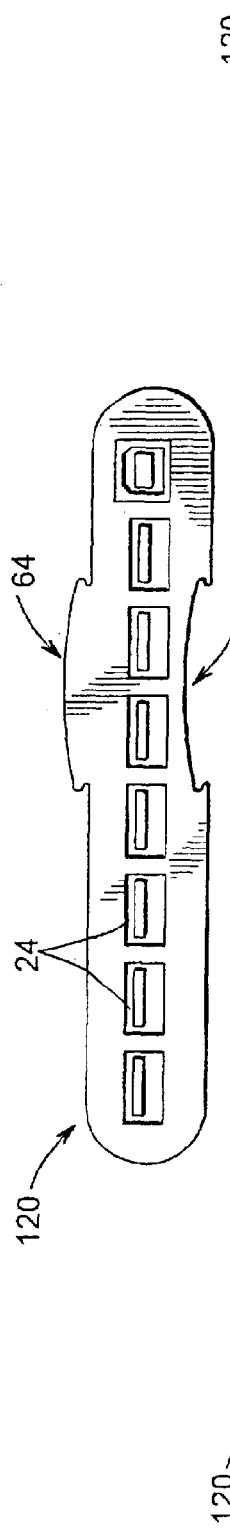
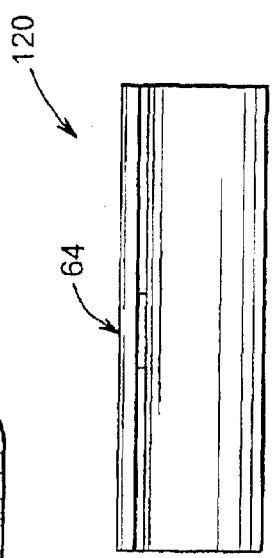
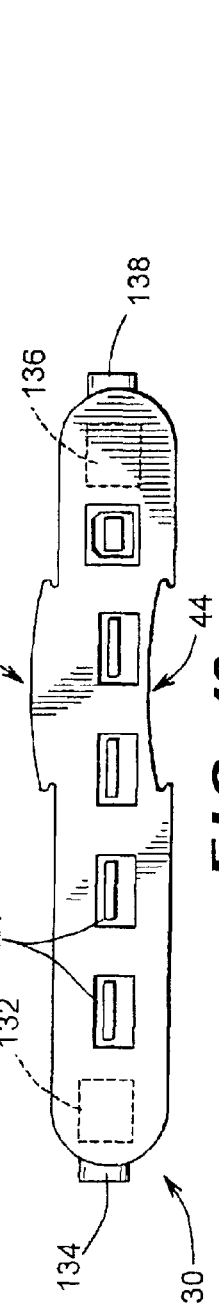
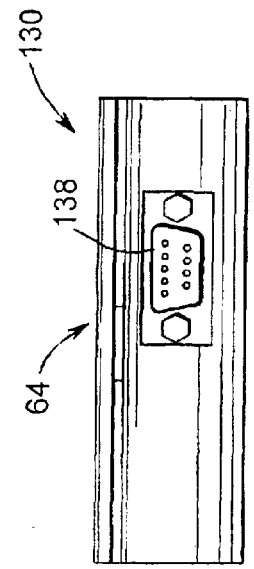
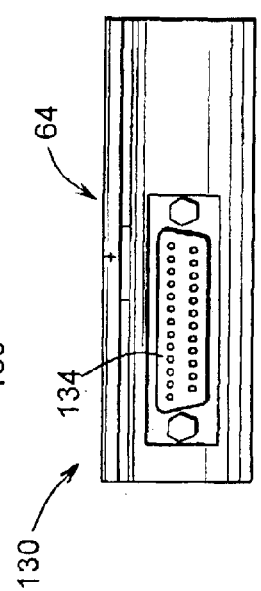

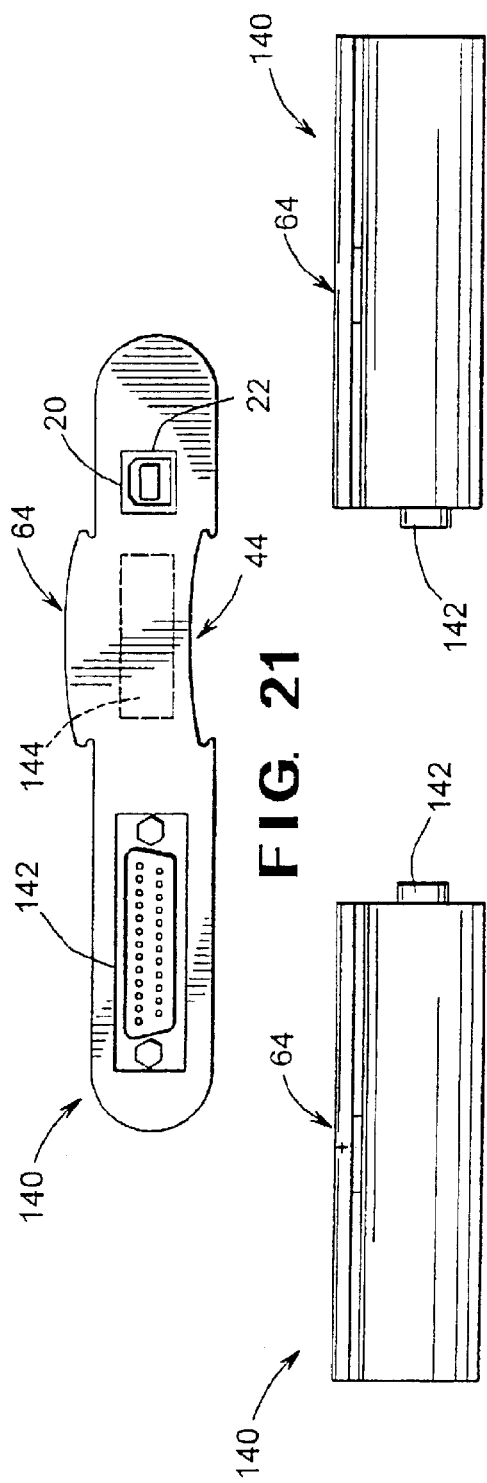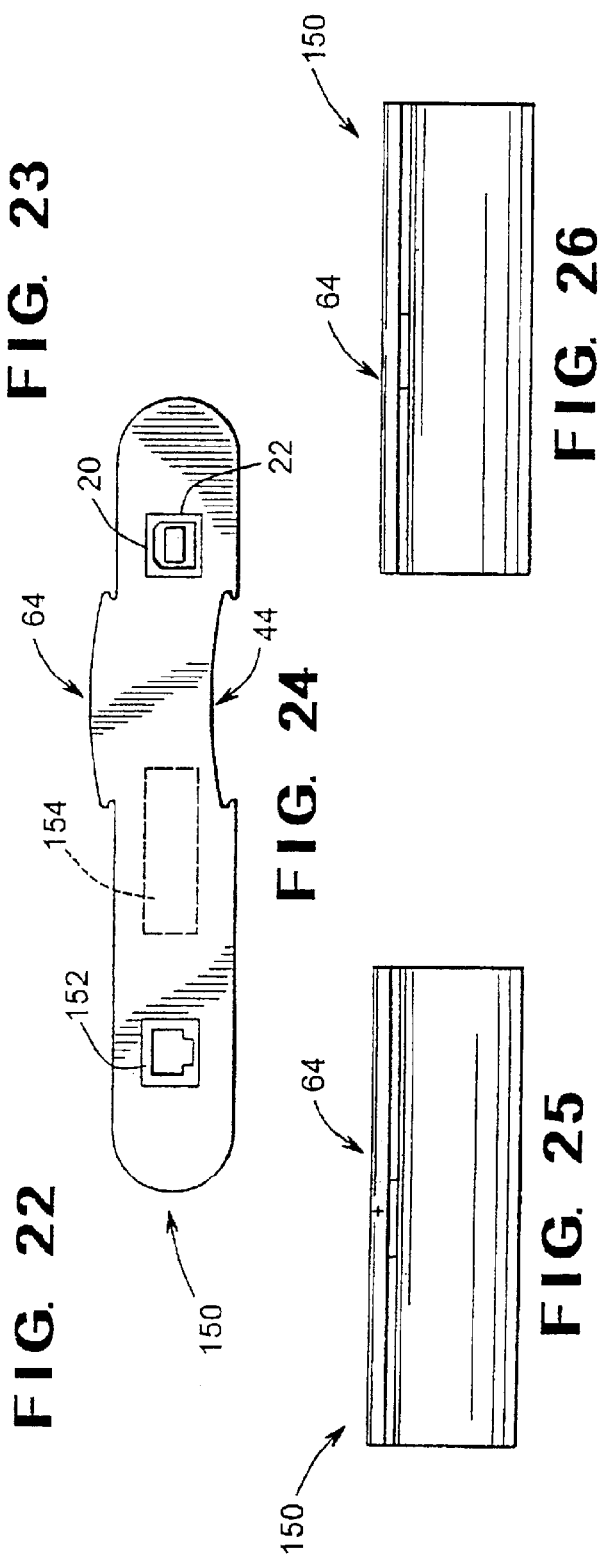

STACKABLE POWER SUPPLY SYSTEM

RELATED APPLICATIONS

The present application is a continuation-in-part of application Ser. No. 09/730,030, filed Dec. 5, 2000, entitled Modular Stackable Component System Including Universal Serial Bus Hub. application Ser. No. 09/730,730 is co-pending at the time of filing the present application. This application claims the benefit of U.S. Provisional Application No. 60/169,055, filed Dec. 6, 1999, and application Ser. No. 09/730,030, filed Dec. 5, 2000. The provisional application Ser. No. 60/169,055, and the utility application Ser. No. 09/730,030 are hereby incorporated by reference in their entirety.

BACKGROUND OF THE INVENTION

The present invention relates to a Universal Serial Bus (hereinafter USB) hub, and more particularly to a modular stackable component system including a base unit and one or more stackable hubs mounted to the base unit.

A personal computer system typically includes a computer, a display such as a CRT or flat panel display, and other peripheral devices communicating with the computer for entering data, printing data or controlling the computer. The peripheral devices require a connection to the computer which will enable them to communicate with the computer. Typically, most peripheral devices communicate with the computer over an individual connection cable having a corresponding connector attached to the computer.

A USB hub provides a convenient central data connection point for attaching multiple peripheral devices to a computer. The hub relays data from the computer to all enabled devices connected to the data hub, and relays data from the enabled devices to the computer. This data relay is performed without any data storage or significant delay. The USB hub is connected to the computer via a single USB upstream connector. The USB hub also includes a plurality of downstream ports for connecting the peripheral devices to the hub. The USB hub uses standardized connectors at the upstream and downstream data ports to provide universal connectivity between peripheral devices and the computer, thus simplifying these connections by eliminating different cords and connectors. The terms "upstream" and "downstream" will be used in the present application in their conventional sense when referring to the transfer of data.

Conventional USB hubs receive power for low power applications via a positive voltage conductor and a ground conductor from a source, such as the computer, through the upstream port. Conventional USB hubs are also equipped with a connector for connecting with a transformer plugged into a typical AC outlet for providing DC power to the hub for high power applications. The terms "upstream" and "downstream" will be also be used in the present application in their conventional sense when referring to the transfer of power for low power and high power applications to a single hub.

When more than one conventional USB hub is used, each hub is connected to a separate transformer for high power applications, resulting in a clutter of cords, transformers, and used outlets. It is desirable to simplify the connection of multiple USB hubs, thereby reducing the number of cords and transformers needed, as well as providing a more space efficient footprint, by providing a system having a base with a power supply to which hubs of all types can be mechanically and electrically attached by stacking the hubs one on top of the other.

The base will be the "most" downstream point as far as the power being supplied by the system is concerned. The first "hub" stacked on the base, and mechanically and electrically connected thereto, will be sometimes referred to as being "upstream" of the base unit, and the next "hub" will be further upstream, etc., and "hubs" which are closer to the base will be sometimes referred to as "downstream" of "hubs" which are farther from the base, it should be understood that the direction of power transfer is only "upstream" from the base unit. There is no power transfer from a "hub" downstream to the base unit.

SUMMARY OF THE INVENTION

A modular stackable USB hub system includes a base unit having a suitable power supply therein. The power supply is connected to a first or top power port for supplying power to a stackable USB hub releasably connected to the base.

A stackable USB hub having a first or top power port for accepting other upstream components in a stackable component system is also provided. The first or top power port includes a first or top power port connector, a voltage conductor and ground conductor for providing voltage and ground to an upstream component to supply the high current requirements of the component hub in high power applications, thereby eliminating the need for a separate transformer for the USB hub in high power applications.

The stackable USB hub further includes a second or bottom power port for connecting or mounting to other components in the modular stackable component system, such as a base unit or a downstream hub. The second or bottom power port includes a second or bottom power port connector, a voltage conductor and a ground conductor. The voltage and ground conductors are connected to the respective voltage and ground conductors of the USB first or top power port connector for passing voltage and ground to the upstream component connected to the hub, as well as to the circuit or circuit board in the stackable component, thereby eliminating the need for a separate transformer for each component of the system. The stackable configuration also reduces the footprint of the system. It should be understood that the voltage and ground conductors, while a part of the power port, do not physically need to be part of the power port connector.

BRIEF DESCRIPTION OF THE DRAWINGS

The advantages of the invention will become readily apparent to those skilled in the art from the following detailed description of a preferred embodiment when considered in the light of the accompanying drawings, in which:

FIG. 2 is a perspective view of an improved USB hub embodying the present invention;

FIG. 3 is a front elevational view of the improved USB hub shown in FIG. 2;

FIG. 4 is a left side elevational view of the improved USB hub shown in FIG. 2;

FIG. 5 is a right side elevational view of the improved USB hub shown in FIG. 2;

FIG. 11 is a front elevational view of a base unit in accordance with the present invention;

FIG. 12 is a left side elevational view of the base unit shown in FIG. 11;

FIG. 13 is a right side elevational view of the base unit shown in FIG. 11;

FIG. 14 is a sectional elevational view of the base unit shown in FIG. 11;

FIG. 15 is a front elevational view of an alternate embodiment of the stackable USB hub in accordance with the invention;

FIG. 16 is a left side elevational view of the improved USB hub shown in FIG. 15;

FIG. 17 is a right side elevational view of the improved USB hub shown in FIG. 15;

FIG. 18 is a front elevational view of a second alternate embodiment of the stackable USB hub in accordance with the invention;

FIG. 19 is a left side elevational view of the improved USB hub shown in FIG. 18;

FIG. 20 is a right side elevational view of the improved USB hub shown in FIG. 18;

FIG. 21 is a front elevational view of a stackable USB to SCSI converter in accordance with the invention;

FIG. 22 is a left side elevational view of the stackable USB to SCSI converter shown in FIG. 21;

FIG. 23 is a right side elevational view of the stackable USB to SCSI converter shown in FIG. 21;

FIG. 24 is a front elevational view of a stackable USB to LAN converter in accordance with the invention;

FIG. 25 is a left side elevational view of the stackable USB to LAN converter shown in FIG. 24;

FIG. 26 is a right side elevational view of the stackable USB to LAN converter shown in FIG. 24;

FIG. 37b is a rear view of the face plate shown in FIG. 37a.

It is to be understood that the present invention is not limited to the details of construction and arrangement of parts illustrated in the accompanying drawings, since the invention is capable of other embodiments, and is capable of being practiced or carried out in various ways within the scope of the claims. Also, it is to be understood, that the phraseology and terminology employed herein is for the purpose of description, and not of limitation.

DETAILED DESCRIPTION OF THE PREFERRED EMBODIMENTS

The specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
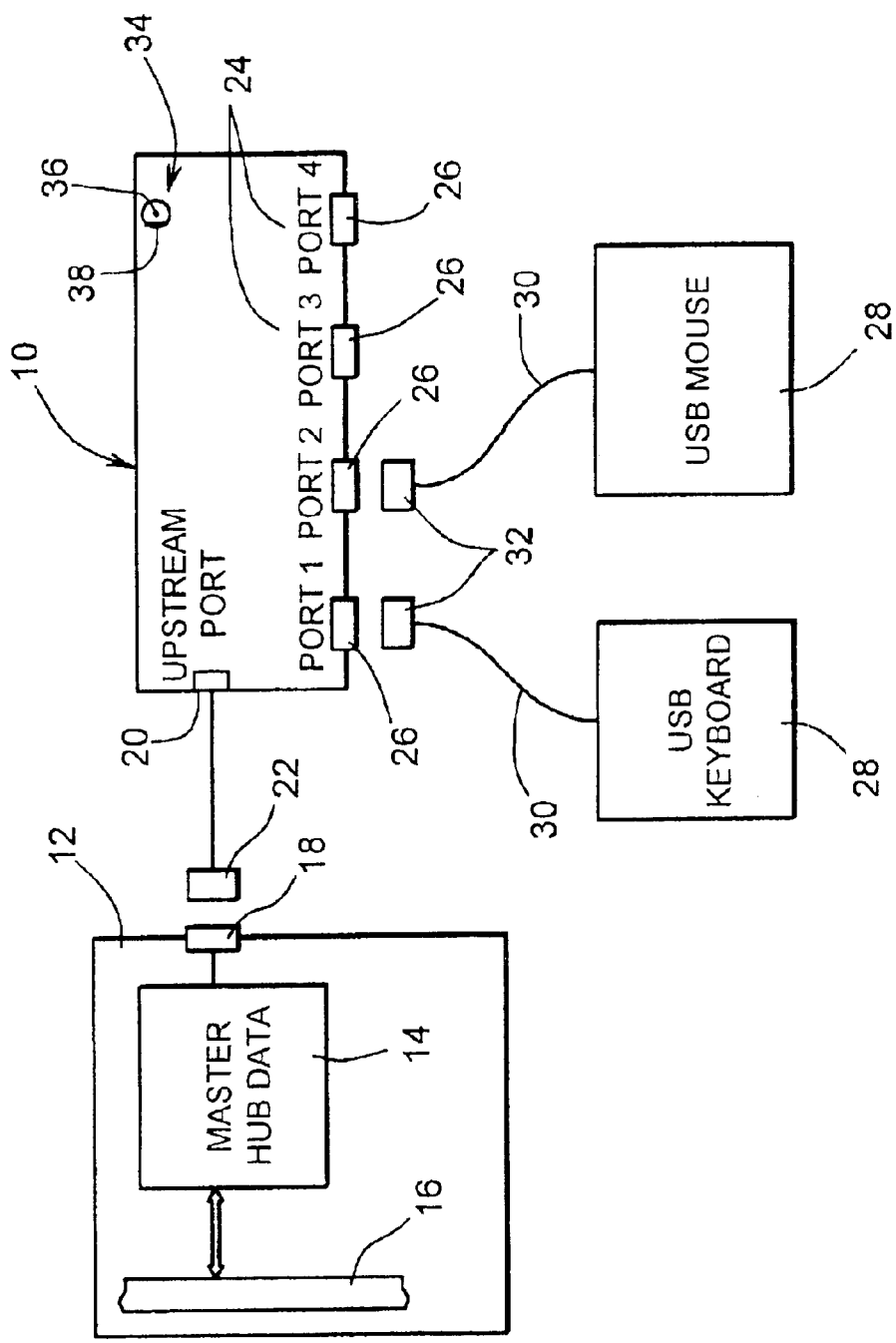
FIG. 1 is a block diagram illustrating a conventional universal serial bus hub.
Figure 6:
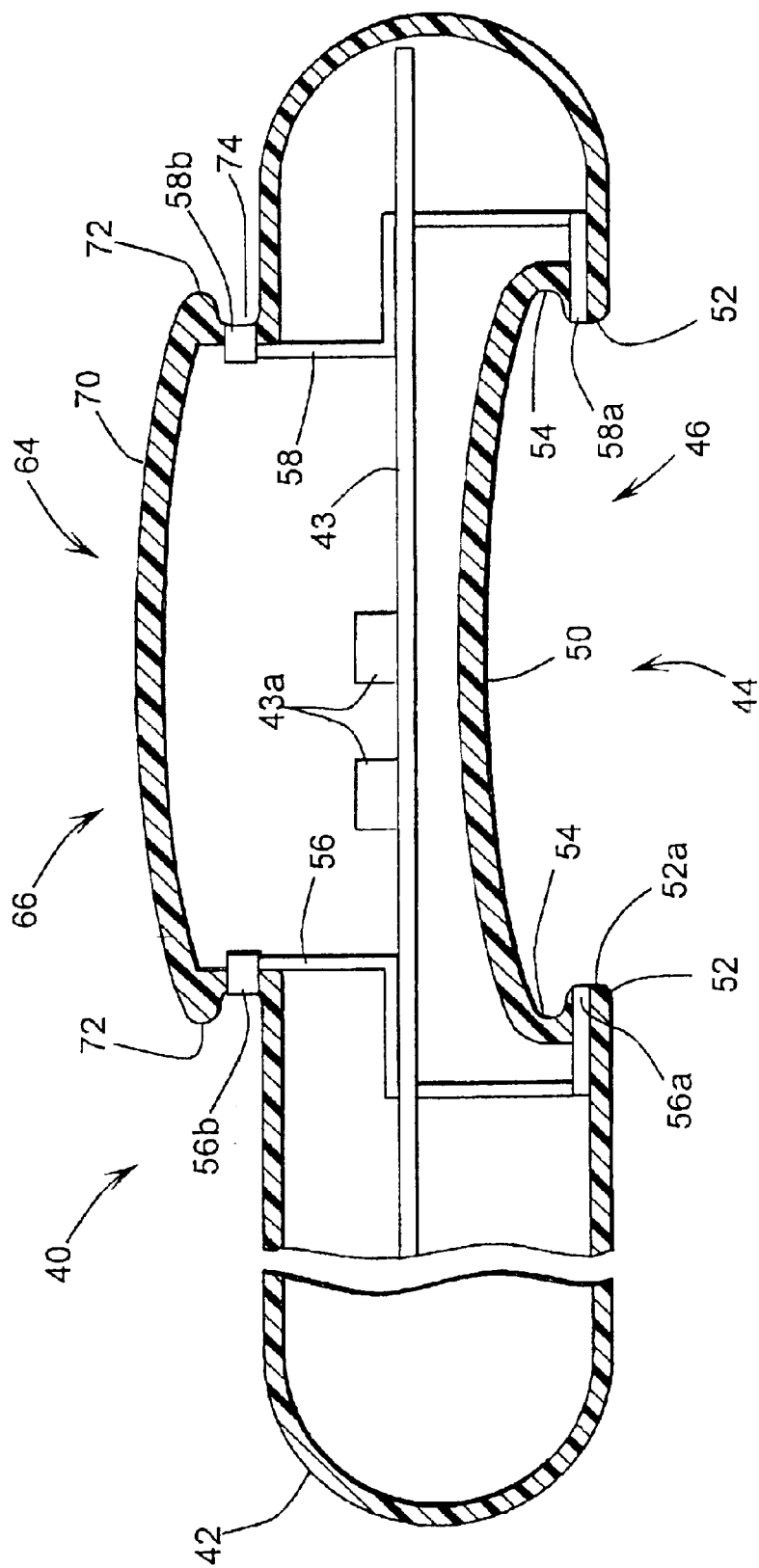
FIG. 6 is a sectional view, taken in the direction of the arrows, along the section line 6—6 of FIG. 2.

Referring to FIG. 1, a block diagram is shown illustrating the connection of a known USB hub 10 to a computer 12. The computer 12 has a USB interface which includes a master data hub 14 for receiving data from the USB hub 10.

The master data hub 14 is coupled to the computer 12 via an internal bus 16 which provides a communication path between the master data hub and the computer. The master data hub 14 includes at least one USB connector 18. The USB hub 10 includes an upstream port 20 having a corresponding USB plug 22 which connects to the USB connector 18 of the master data hub 14.

The USB hub 10 also includes a plurality of downstream ports 24 having downstream USB connectors 26 to permit multiple peripheral devices 28, such as a keyboard, mouse, etc., to be coupled to the master data hub 14 through the USB hub 10. The peripheral devices 28 are each connected by a connection cable 30 to a USB connector 32 which mates with the downstream port connectors 26 of the USB hub 10.

The USB hub 10 typically contains connections for receiving power in two ways. First, the USB hub is bus powered for applications in which total current provided to the hub is less than approximately 500 mA. In bus powered applications, the USB hub receives power through the upstream port 20 from the USB plug 22 which contains separate positive and ground conductors. The USB hub can transfer a limited amount of current, approximately 100 mA, to each of four devices through the downstream ports 24 via positive and ground conductors in the downstream connectors 26.

The USB hub 10 also includes a separate power connector 34 for receiving sufficient power to supply the higher current demands to the downstream ports 24 in high power applications. The power connector 34 includes a positive voltage conductor 36 and a ground conductor 38 for receiving DC voltage, preferably 5 volts, from a typical transformer (not shown) connected to an AC powered outlet (also not shown).

Referring now to FIGS. 2–6, a stackable modular four port USB hub is shown generally at 40. The components of the USB hub 40, which are similar to the conventional USB hub shown in FIG. 1, are indicated with the same numerals. The stackable USB hub includes a USB type B female connector 22 connected to an upstream port 20 (refer to port 20 shown in FIG. 1) and four USB type A female connectors 26 connected to corresponding downstream ports 24 (refer to ports 24 shown in FIG. 1). The stackable USB hub further includes a housing 42 for mounting the USB A and B connectors 22, 26 and a circuit board 43 containing conventional USB hub circuitry 43a.

The USB hub housing 42 includes an first or top power port 64 for mounting the stackable USB hub 40 to a stackable upstream component (described in detail below) and for supplying power and ground to the upstream component for high power hub applications. Furthermore, the USB hub housing 42 includes a second or bottom power port 44 for mounting a stackable downstream component (described in detail below) to the USB hub and for passing the power and ground received from the second or bottom power port 44 to the hub, thereby supplying its high power demands.

The second or bottom power port 44 includes a second or bottom power port connector 46 (hereinafter called the second connector) for mating with a complementary shaped mating connector on the second or bottom power port of the downstream component as shall be described in detail below. The upstream and/or downstream connector may be of a quick connect type, if desired.

The first connector 46 is preferably a female connector, including a recess 50, and a pair of flanges 52. Each flange 52 extends out over the recess 50 terminating in an inner edge 52a. A groove 54 is defined between the flange 52 and the recess 50. The flanges 52 extend from opposite sides of the recess 50 defining a pair of oppositely disposed grooves 54. The grooves 54 preferably extend along the entire sides of the recess, although alternatively, they may not. The recess 50, flanges 52, and grooves 54 preferably extend across the entire housing 42, although alternatively, they may only extend across a portion of the housing.

A positive voltage conductor 56 is disposed in one of the flanges 52 such that it terminates in a first end 56a which is flush with, or which extends slightly from, the inner edge of the flange 52a. A ground conductor 58, including a first end 58a, is disposed in the opposite flange 52 in a similar manner. The voltage and ground conductor first ends 56a, 58a are located a predetermined distance from the end of the grooves 54, and preferably across from each other although, alternatively, they may be located at different distances from the ends of the grooves. The voltage and ground conductors 56, 58 are electrically connected to the circuit board 43 and with the USB circuitry 43a in a conventional manner so as to provide power to the USB hub for high power applications described above.

The USB hub first or top power port 64 includes a first or top power port connector 66 (hereinafter called the first connector) for mating with the complementary shaped second connector 46 of another stackable USB hub device as shall be described in detail below. The first connector 66 is preferably a male connector having a boss 70 protruding from the housing. The boss 70 has a shape which is complementary to the recess 50 thereby allowing the boss to be received within the recess. The first connector 66 further includes a pair of flanges 72, each flange extending from the opposite side of the boss. A groove 74 is defined between each flange 72 and the housing 42 at the base of the boss 70. The grooves 74 preferably extend along the entire sides of the boss 70, although alternatively, they may not. The boss 70, flanges 72, and grooves 74, preferably extend across the entire housing 42, although alternatively, they may only extend across a portion of the housing.

The positive conductor 56 described above also extends to first connector 66 of the first or top power port 64, terminating in a second end 56b which is disposed in one of the second connector grooves 74 such that the second end is flush with, or extends slightly from, the groove.

The ground conductor 58 described above includes a second end 58b which is disposed in the opposite groove 74 in a similar manner. The positive conductor second end 56b is disposed a predetermined distance from the end of the groove 74, thereby corresponding to the same location as the positive conductor first end 56a in the first connector. Similarly, the ground conductor second end 58b is disposed at a location which corresponds to the location of the ground conductor first end 58a in the first connector.

The first and second connectors may alternatively be switched such that the first connector is a male connector embodying the features of the second connector, and the second connector is a female connector embodying the features of the first connector. Alternatively, neither connector may be considered as male or female, but rather each may have complimentary shaped features for connecting to the other. The first and second connectors 66, 46 described above are only examples of connectors which are suitable for the first or top and second or bottom power ports. Any known connector or coupler may be used to connect, mount, couple, join or link the first or top power port 66 of the hub 40 to another stackable component having a second or bottom power port 44 and the second or bottom power port of the hub 40 to another stackable component having a first or top power port. Examples of such connectors include a housing portion and shroud, mating surfaces and fasteners, screw type, tongue and groove, and cam and groove connectors.

Additionally, the connectors may include retainers for keeping the connectors connected, such as a recess and a protrusion, a "snap" type retainer, a "snap-lock" type, an "internal snap" type, a "locking" type or a "finger pressure removal" type, or any known fasteners, including screws, bolts and the like.

An optional conventional power connector 48 may also be disposed on the housing 42. The power connector 48 includes a positive voltage conductor 48*a* and a ground conductor 48*b* for providing DC voltage, preferably 5 volts, and ground to the hub 40 from a conventional source such as a transformer (not shown) connected to a conventional AC power outlet, or from the computer (not shown) as shall be described in further detail below. The voltage and ground conductors 48*a*, 48*b* are electrically connected to the circuit board 43 and the USB circuitry 43*a* in a conventional manner so as to provide power to the USB hub 40 for high power applications. Additionally, the voltage and ground conductors 48*a*, 48*b* are electrically connected to the positive voltage conductor 56 and the ground conductor 58. The power connector 48 may be any conventional power connector known in the art.

Figure 7:
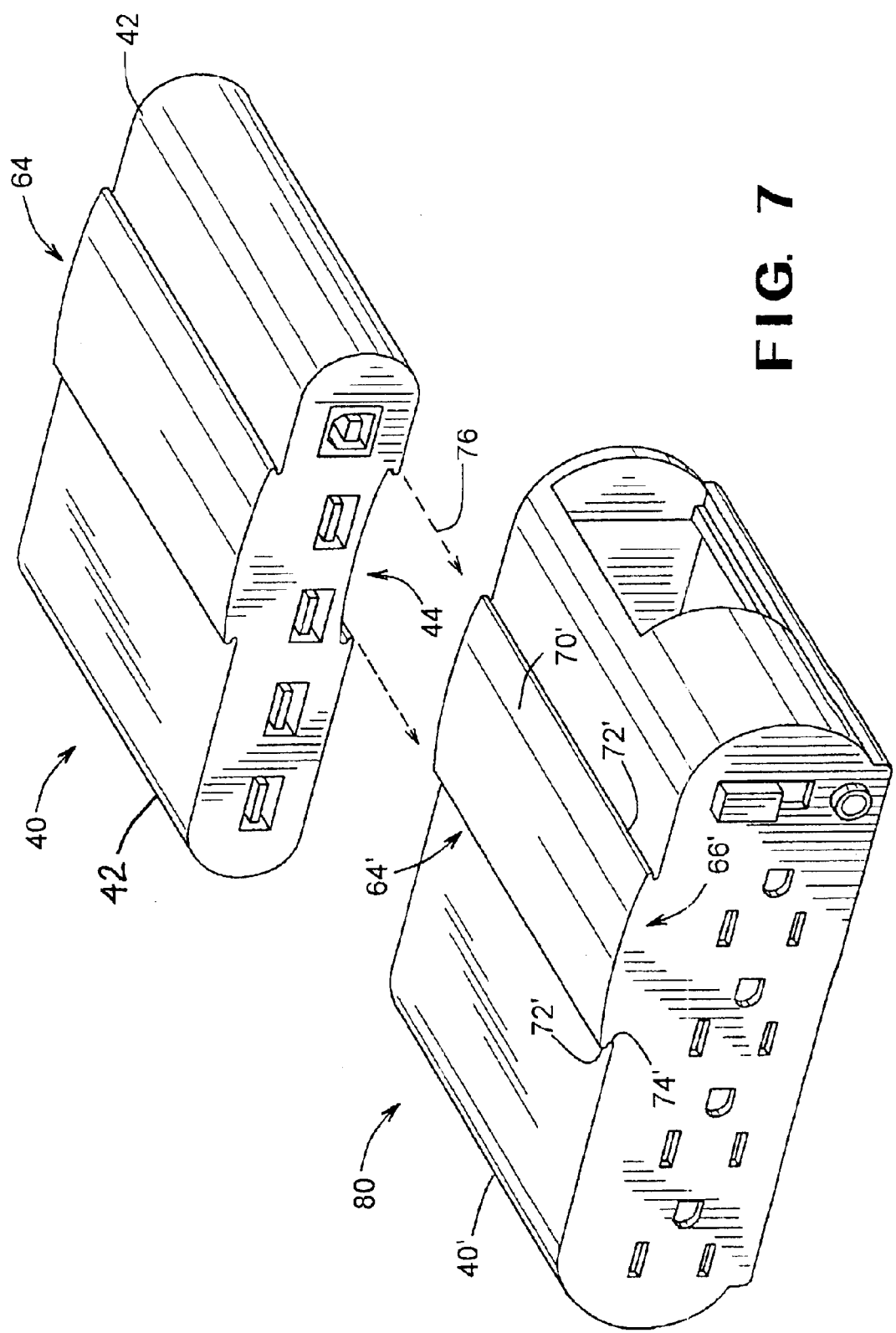
FIG. 7 is a perspective view of the improved USB hub shown in FIG. 2 connecting with a downstream component in accordance with the present invention.
Figure 8:
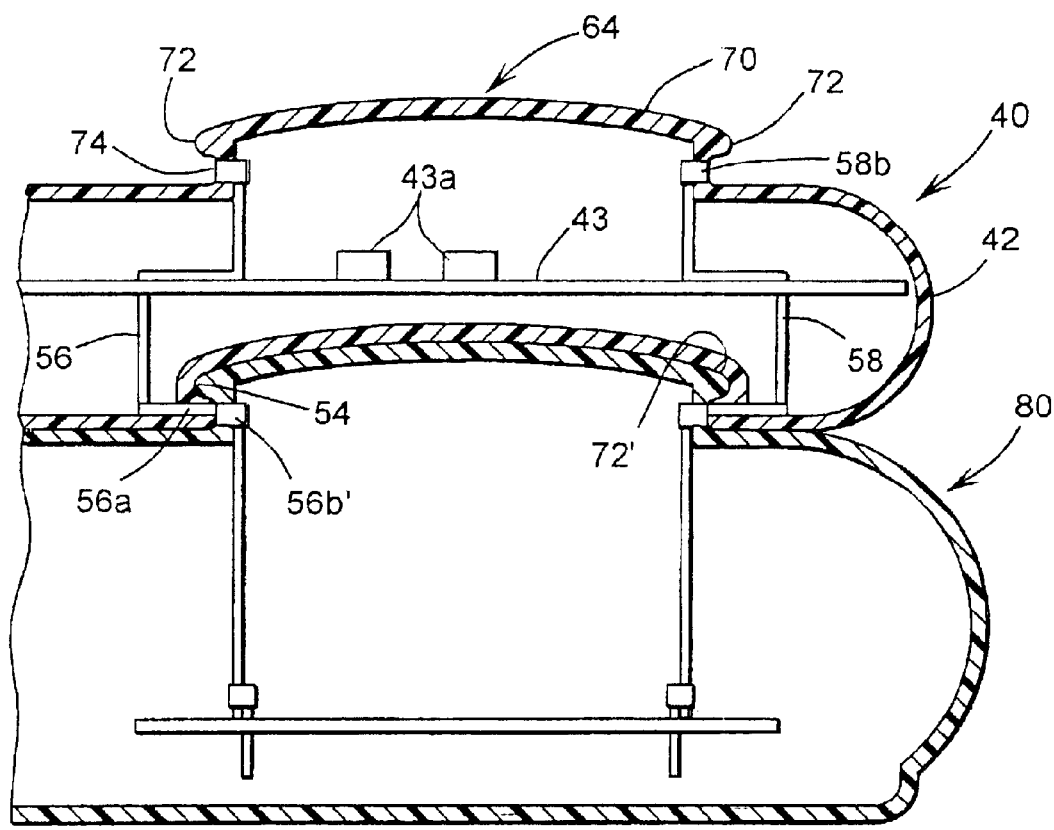
FIG. 8 is a partial sectional elevational view of the improved USB hub shown in FIG. 7, when fully connected.
Figure 9:
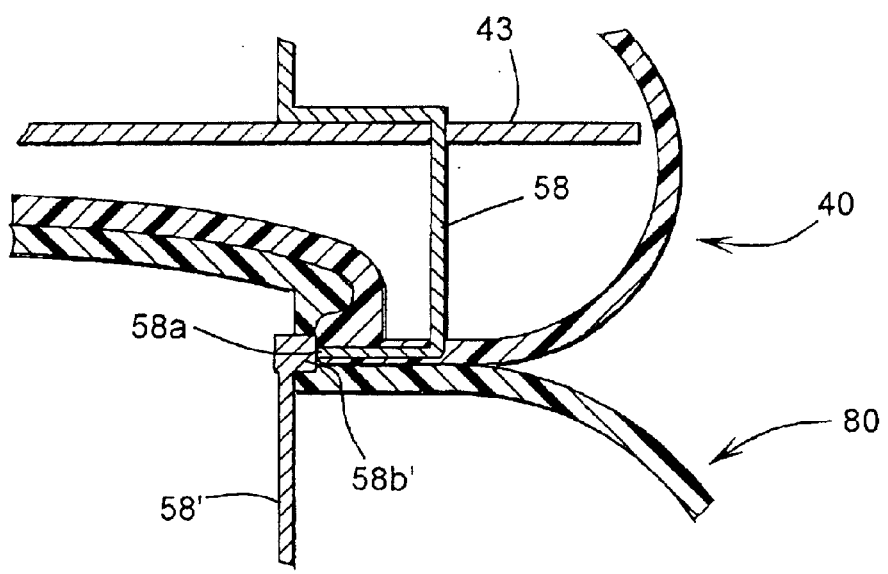
FIG. 9 is an enlarged view of a portion of the improved USB hub shown in FIG. 8.

Referring now to FIGS. 7–9, the stackable USB hub 40 can be mounted to a downstream component 80 in the modular stackable USB hub and surge suppressor system via the second or bottom power port 44. The upstream component 40 may be any stackable component having the first or top power port 64 described above. Examples of the upstream component 40 include, but are not limited to, a base unit (described below), another USB hub, a stackable USB to LAN converter (described below), or a stackable USB to SCSI converter (described below).

The upstream component 40 includes a housing 40' having a first or top power port 64 which is similar to the first or top power port 64' of the downstream component 80, including a second connector 66' having a boss 70', flanges 72' and grooves 74'. The first or top power port 64' provides a physical connection between the USB hub 40 and the downstream component 80 via the first connector 46 thereby securing the USB hub housing 42 to the downstream component housing 40'. Additionally, the second or bottom power port 44 provides an electrical connection between the USB hub 40 and the downstream component 80, passing a positive voltage and ground from the downstream component to the USB hub 40 for supplying its power requirements in high power applications.

The USB hub 40 may be connected to the downstream component 80 by sliding the second or bottom power port connector 44 of the upstream component 40 into the first connector 66 of the USB hub (as shown by arrows 76 in FIG. 7) so that the boss 70' of the first connector 66' is received in the recess 50 (FIG. 6) of the second connector 46 on the USB hub. The second connector flanges 52 slide into the first connector grooves 74', and the first connector flanges 72' slide into the second connector grooves 54. The two components 40, 80 are connected correctly when the first ends 56*a* and 58*a* of the second connector voltage and ground conductors 56, 58 make electrical contact with the corresponding voltage and ground conductors 56' 58' in the first connector. This electrical connection provides the high current power connection between the stackable USB hub 40 and the other component 80.

Figure 10:
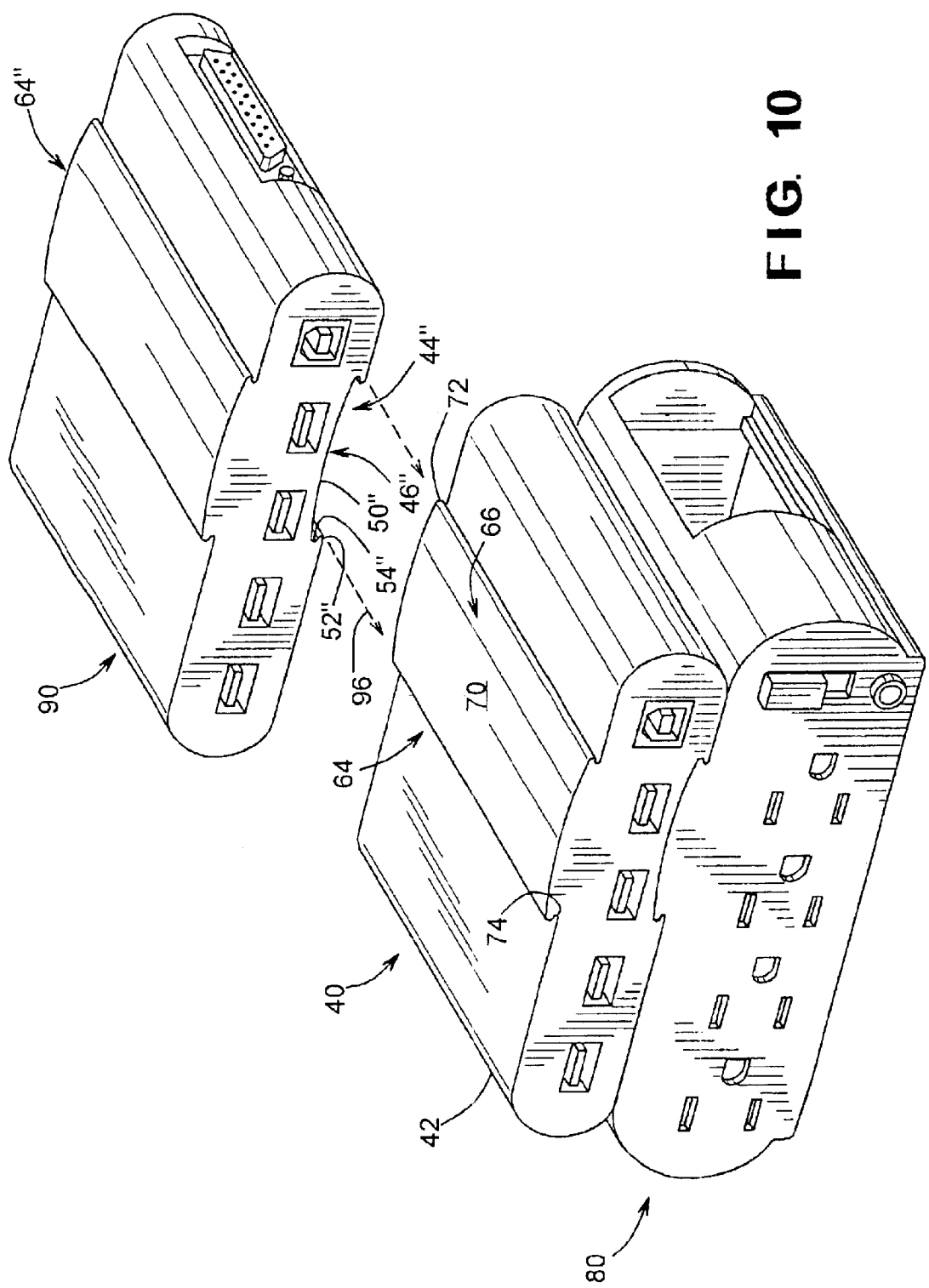
FIG. 10 is a perspective view of the improved USB hub shown in FIG. 2 connecting with an upstream component and a downstream component in accordance with the present invention.

Referring now to FIG. 10, an upstream component 90 may be connected to the USB hub 40 via the first or top power port 64 while the USB hub is connected to the downstream component 80. Examples of the upstream component 90 include but are not limited to another USB hub, a stackable USB to LAN converter (described below), or a stackable USB to SCSI converter.

The upstream component 90 includes at least a second or bottom power port 44" and preferably also a first or top power port 64", having all of the features of the USB upstream and downstream ports 44, 64 described above. The USE hub 40 first or top power port 64 may be connected to the second or bottom power port 44" of the upstream component 90 by sliding the first connector 66 of the USB hub 40 into the second connector 46" of the downstream component 90 (as shown by arrows 96 in FIG. 10) so that the boss 70 of the USB first connector 66 is received in the recess 50" of the second connector 46" on the upstream component 90. The second connector flanges 52" slide into the USB hub first connector grooves 74, and the USB hub first connector flanges 72 slide into the second connector grooves 54" on the upstream component 90.

The USB hub 40 and the upstream component 90 are connected correctly when the second ends 56*b* and 58*b* of the USB hub first connector positive and ground conductors 56, 58 make electrical contact, with the corresponding positive and ground conductors 56", 58" in the second connector 46" of the upstream component 90.

When the upstream component 90 is connected to the USB hub 40 in this manner, and the USB hub is connected to the downstream component 80 as described above, the positive voltage and ground for high power applications is passed from the downstream component 80, through the USB hub 40, to the upstream component 90.

Referring now to FIGS. 11–14, a base unit 100, an example of an downstream component 80, is shown. The base unit 100 includes a housing 101. The base unit also includes a power cord 102 for connecting to a conventional AC outlet (not shown) thereby providing power to the base unit. Conventional outlets 104 are disposed on the housing 101 for distributing AC power to other electrical components connected to the outlets in a known manner. The base unit 100 also includes an optional on/off switch 106 and a circuit breaker 108 which are conventional and known in the art.

The base unit 100 also includes bays 110 disposed in the housing 101 for receiving one or more surge suppressor modules 112. The surge suppressor modules 112 include conventional surge suppression circuitry (shown in phantom at 113 in FIG. 14) which is known in the art for providing surge suppression to any conventional electrical components 114 connected to the modules via connectors 116. The connectors 116 may be conventional co-axial connectors, RJ11 connectors for connecting telephone lines for modems, RJ45 connectors or any other suitable connectors. A ground conductor 117*a* is provided in the bay 110 for connection to a ground conductor 117*b* disposed on the surge suppressor module 112 for providing ground to the surge suppression circuitry 113 when the module is received in the bay. The ground conductors 117*a*, 117*b* have complementary shape so as to connect together in any known manner.

The base unit 100 may optionally provide surge suppression to electrical components connected to the outlets 104 via conventional surge suppression circuitry contained within the USB circuitry 43a described above. Alternatively, a separate removable surge suppression module 112 housed within one of the bays 110 may provide the surge suppression to the electrical components connected to the outlets 104.

The base unit 100 also includes a first or top power port 64' similar to the USB first or top power port 64 described above. Any stackable modular component may be mounted to the base unit 100 via the first or top power port 64' as described above.

An optional conventional power connector 118 may also be disposed on the housing 101. The power connector 118 includes a positive voltage conductor 118a and a ground conductor 118b for providing DC voltage, preferably 5 volts, and ground to the base unit 100 from a conventional source such as a transformer (not shown) connected to a conventional AC power outlet, or from the computer (not shown) as shall be described in further detail below. The voltage and ground conductors 118a, 118b are electrically connected to the positive voltage conductor 56 and the ground conductor 58 described above. The power connector 48 may be any conventional power connector known in the art.

Referring now to FIGS. 15–17, an alternate embodiment of the stackable USB hub 40 described above is shown generally at 120. The alternate embodiment is a seven port USB hub 120 having seven downstream USB data ports 24 with seven USB connectors (not shown) for connecting seven peripheral devices (shown at 28 in FIG. 1) to the USB hub 120. The seven port USB hub 120 is similar to the four port USB hub 40 described above, and includes a similar first or top power port 64 and second or bottom power port 44.

Referring now to FIGS. 18–20, a second alternate embodiment of the stackable USB hub 40 described above is shown generally at 130. The second embodiment is a stackable four port USB hub 130 including all of the features of the stackable four port USB hub 40 described above. In addition, the USB hub 130 includes conventional USB to parallel converter circuitry (shown in phantom at 132) and a parallel connector 134 which are known in the art. The USB hub 130 further includes conventional USB to serial converter circuitry (shown in phantom at 136) and a serial connector 138 which are also known in the art.

Referring now to FIGS. 21–23, a stackable USB to SCSI converter is shown general at 140. The stackable USB to SCSI converter 140 includes the first or top power port 64 and the second or bottom power port 44 described above. The stackable USB to SCSI converter 11) 140 further includes a conventional USB upstream port 20 (refer to port 20 shown in FIG. 1) and connector 22, a DB25 or HP DB50 Port and connector 142, and conventional circuitry (shown in phantom at 144) which is known in the art for converting data between USB format and SCSI format. The stackable USB to SCSI converter 140 is mountable to any stackable component described herein via the first and/or second power ports 64, 44. The stackable USB to SCSI converter 140 receives the positive voltage and ground through the second or bottom power port 44 for powering the converter 140 and associated circuitry 144. Furthermore, the stackable USB to SCSI converter 140 passes the positive voltage and ground to other stackable components mounted to the first or top power port 64 as described above.

Referring now to FIGS. 24–26, a stackable USB to LAN adapter 150 is shown general at 150. The stackable USB to LAN adapter 150 includes the first or top power port 64 and the second or bottom power port 44 described above. The stackable USB to LAN adapter 150 further includes a conventional USB upstream data port 20 (refer to port 20 shown in FIG. 1) and connector 22, a LAN cable connector 152, and conventional circuitry (shown in phantom at 154) which is known in the art for converting data between USB format and LAN format. The stackable USB to LAN converter 150 is mountable to any stackable component described herein via the ports 64, 44. The stackable USB to LAN converter 150 receives the positive voltage and ground through the second or bottom power port 44 for powering the converter 150 and associated circuitry 154. Furthermore, the stackable USB to LAN converter 150 passes the positive voltage and ground to other stackable components mounted to the first or top power port 64 as described above.

Figure 27:
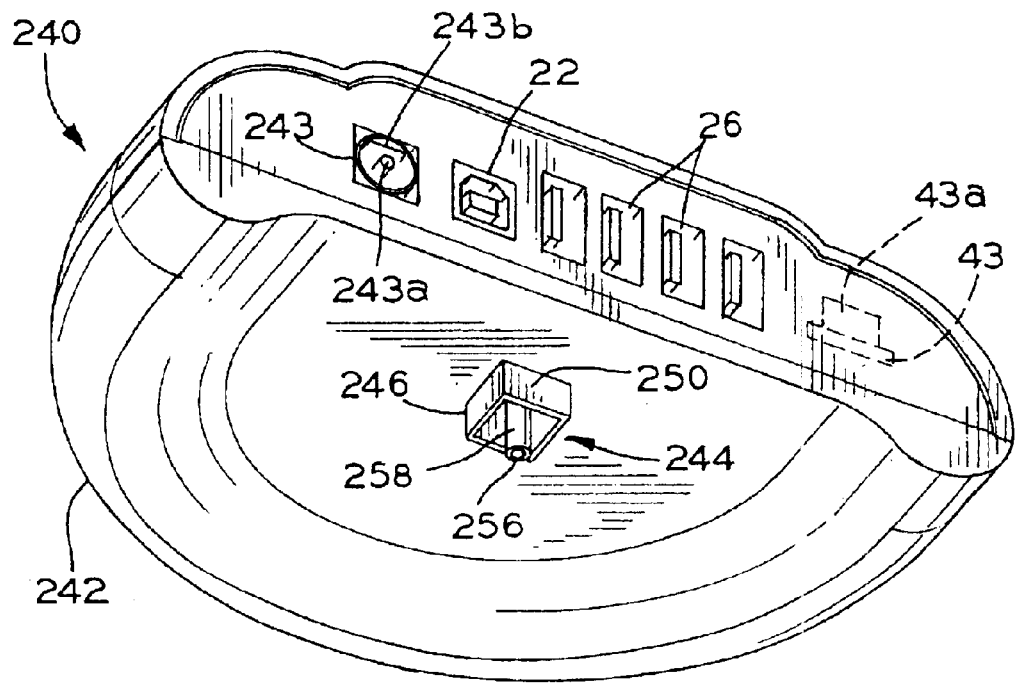
FIG. 27 a perspective view illustrating the back and bottom of a third alternate embodiment of the stackable USB hub in accordance with the invention.
Figure 28:
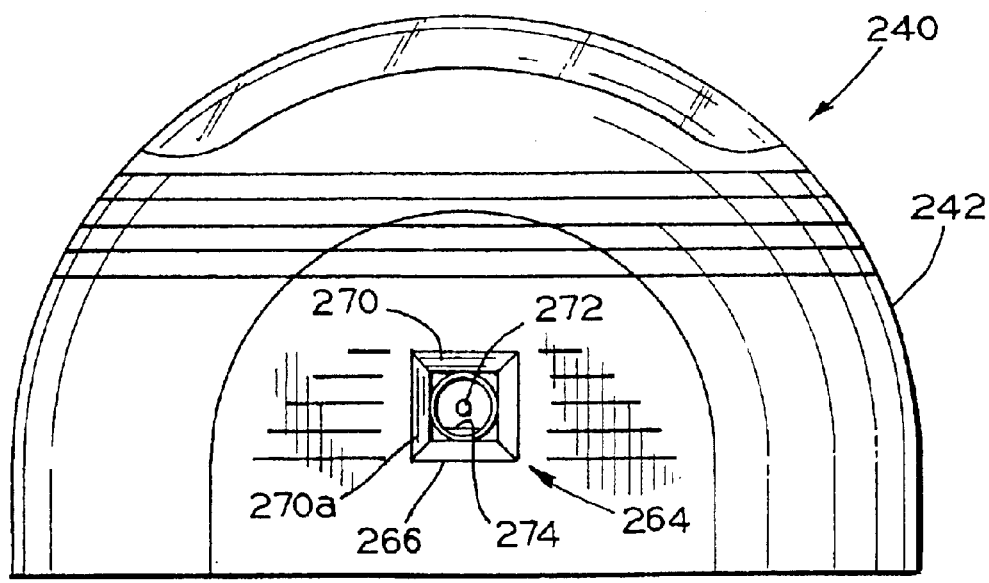
FIG. 28 is a top plan view of the stackable USB hub shown in FIG. 27.
Figure 29:
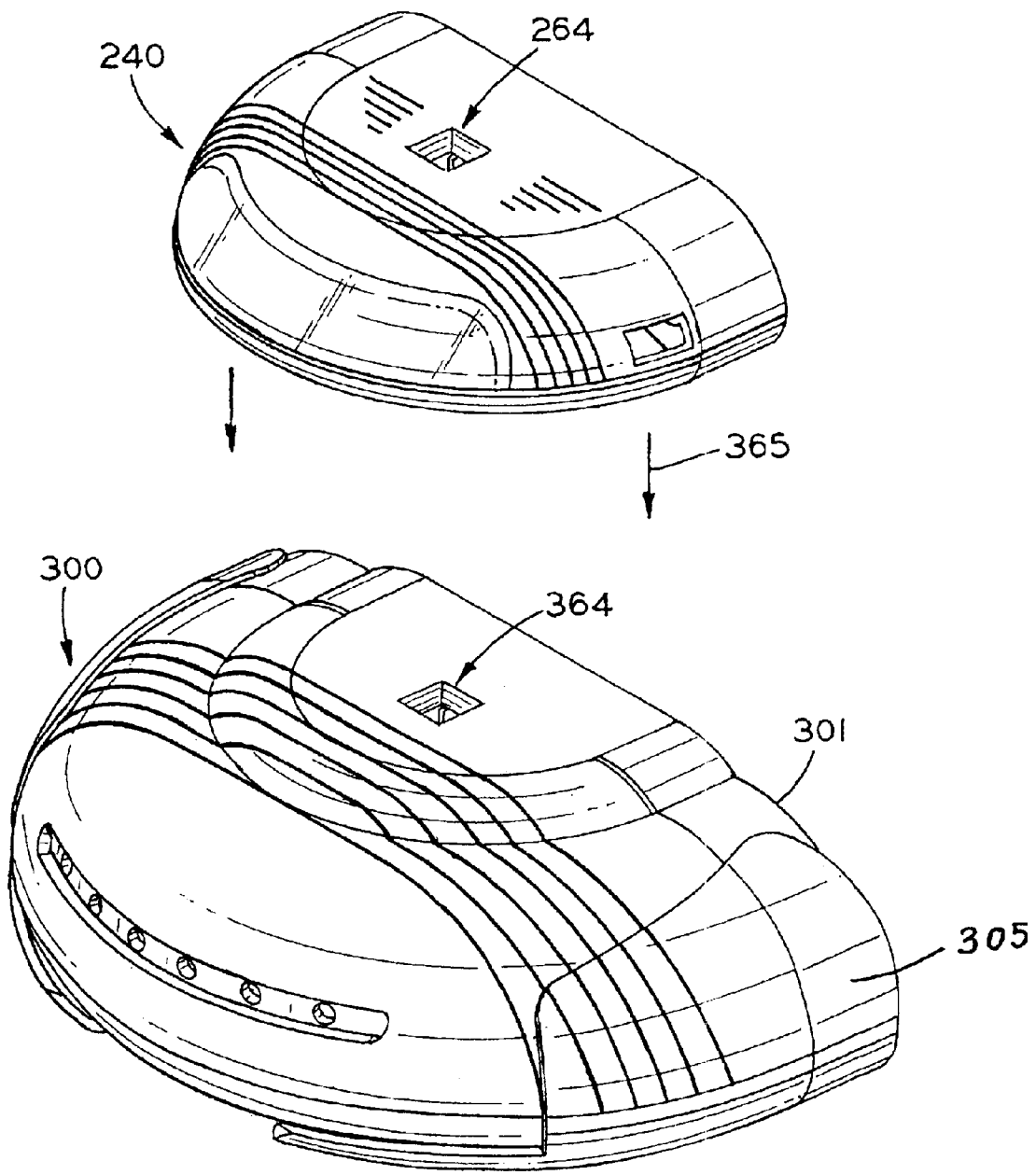
FIG. 29 is a perspective view illustrating an alternate embodiment of the base unit in accordance with the invention and the stackable USB hub shown in FIGS. 27 & 28.

Referring now to FIGS. 27–28, a third alternate embodiment of the stackable USB hub 40 described above is shown generally at 240. The components of the USB hub 240, which are similar to the conventional USB hub shown in FIG. 1, are indicated with the same numerals. The stackable USB hub 240 includes a USB type B female connector 22 connected to an upstream port 20 (refer to port 20 shown in FIG. 1) and plurality of downstream USB ports 24, preferably between 4 and 7 such USB ports. Each port 24 includes a USB type A female connector 26 for connecting peripheral devices 28 as described above to the USB hub 240.

The stackable USB hub 240 also includes a housing 242 containing the circuit board (a portion of which is shown in phantom at 43 and is similar to circuit board 43 described above) within the housing. The circuit board 43 includes conventional USB hub circuitry 43a shown above. The USB type A and B connectors 22, 26 are preferably disposed in the back of the housing 242 although any suitable location may be used.

An optional conventional power connector 243 is also disposed at the back of the housing 242. The power connector 243 includes a positive voltage conductor 243a and a ground conductor 243b for providing DC voltage, preferably 5 volts, and ground to the hub 240 from a conventional source such as a transformer (not shown) connected to a conventional AC power outlet, or from the computer (not shown) as shall be described in further detail below. The voltage and ground conductors 243a, 243b are electrically connected to the circuit board 43 and the USB circuitry 43a in a conventional manner so as to provide power to the USB hub 240 for high power applications.

The USB hub housing 242 includes a second or bottom power port 244, preferably disposed on the bottom of the housing, for mounting the stackable USB hub 240 to a stackable downstream component 80 as described above and for receiving voltage and ground from the downstream component for high power hub applications. Furthermore, the USB hub housing 242 includes a first or top power port 264, preferably disposed on the top of the housing, for mounting a stackable upstream component 90 to the USB hub 240 and for passing the voltage and ground received from the second or bottom power port 244, or from the power connector 243, to the upstream component 90, thereby supplying its power demands.

The second or bottom power port 244 includes a second connector 246 for mating with a complementary shaped first connector on the first or top power port of the upstream component 90. Examples of the upstream component 90 include but are not limited to a base unit (described below), another USB hub, a stackable USB to LAN converter, or a stackable USB to SCSI converter having a suitable second or bottom power port 264 as described below. The second connector 246 is preferably a male connector and includes a boss 250 extending from the housing 242. The boss 250 is preferably square, although alternatively it may be rectangular or any other suitable shape. The boss 250 may have a single continuous wall as shown, or may have two or more separate walls.

The second or bottom power port 244 also includes a positive voltage conductor 256 and ground conductor 258 which extend from the housing, preferably extending beyond the boss 250. The positive conductor 256 and ground conductor 258 preferably form the radially inner and radially outer sides respectively of a conventional cylindrical male DC power connector, although alternatively, the conductors may be reversed, or may form any suitably shaped connector. The voltage and ground conductors 256, 258 are electrically connected to the circuit board 43 and with the USB circuitry 43a in a conventional manner so as to provide power to the USB hub 240 for high power applications described above. Furthermore, the positive voltage conductor 256 and ground conductor 258 also are electrically connected to the positive voltage conductor 243a and ground conductor 243b of the optional power connector 243 disposed at the back of the stackable USB hub 240.

The first or top power port 264 includes a first connector 266 having a shape which is complementary to the second connector 246 so that the second connector 246 will mate with the first connector 266 of the first or top power port of the downstream component 80. The first connector 266 is preferably a female connector and includes a recess 270 extending into the housing 242, preferably at the top of the housing. The recess 270 is shaped to receive the boss 250 described above, accordingly the recess is preferably square, although alternatively it may be rectangular or any other suitable shape which is complementary to the boss. The recess 270 may include an optional bevel 270a to guide the boss 250 within the recess.

The first or top power port 264 also includes a positive voltage conductor 272 and ground conductor 274 which preferably extend beyond the boss 250. The positive conductor 272 is shaped to be received within the conventional cylindrical male DC power connector of the second connector 246 in the second or bottom power port 244. The voltage and ground conductors 272, 274 are electrically connected to the voltage and ground conductors 256, 258 of the second connector 246. Accordingly, voltage and ground are passed from the second or bottom power port 244 to the first or top power port 264 of the stackable USB hub 240, and to the second or bottom power port of another stackable component 90 connected to the stackable hub 240. Additionally, the voltage and ground conductors 272, 274 are electrically connected to the circuit board 43, USB circuitry 43a and to the optional power connector 243 disposed at the back of the stackable USB hub 240.

Referring now to FIGS. 29–32, the stackable USB hub 240 is shown connecting with another example of an downstream component 80, an alternate embodiment of the base unit 100, shown generally at 300. The base unit 300 includes a housing 301, and a power cord 302 for electrically connecting the base unit 300 to a conventional AC outlet (not shown) thereby providing power to the base unit. The base unit also includes conventional outlets 304 for distributing AC power to other electrical components connected to the outlets in a known manner. The base unit 300 also includes an optional sleeve 305, and an optional on/off switch and circuit breaker 306, although alternatively the circuit breaker may be physically separate from the on/off switch as is known in the art.

The base unit 300 also includes bays 310 for receiving one or more surge suppressor modules 312. The surge suppressor modules 312 include conventional surge suppression circuitry 313, similar to the circuitry 113 described above, which is known in the art for providing surge suppression to any conventional electrical components connected to the modules via connectors 316. The connectors 316 may be conventional co-axial connectors, RJ11 connectors for connecting telephone lines for modems, RJ45 connectors or any other suitable known connectors. A ground conductor 317a is provided in the bay 310 for connection to a ground conductor 317b disposed on the surge suppressor module 312 for providing ground to the surge suppression circuitry 313 when the module is received in the bay in a similar manner as described above. The ground conductors 317a, 317b have complementary shape so as to connect together in any known manner. The ground conductor 317b disposed on the module 312 is connected to the surge suppression circuitry 313 by the electrical conductor 313a.

The base unit 300 may optionally provide surge suppression to electrical components connected to the outlets 304 via conventional surge suppression circuitry which is known in the art. Alternatively, a separate removable surge suppression module 320 may be housed within one of the bays 310 (shown in the bottom of the base unit in FIG. 32). The construction of module 320 is described in connection with FIGS. 41–43 hereinbelow. The module 320 includes conventional surge suppression circuitry (shown in phantom at 321) which is known in the art for providing surge suppression to the electrical components connected to the outlets 304. A cover 314 is provided to selectively close the bay 310.

Figure 31:
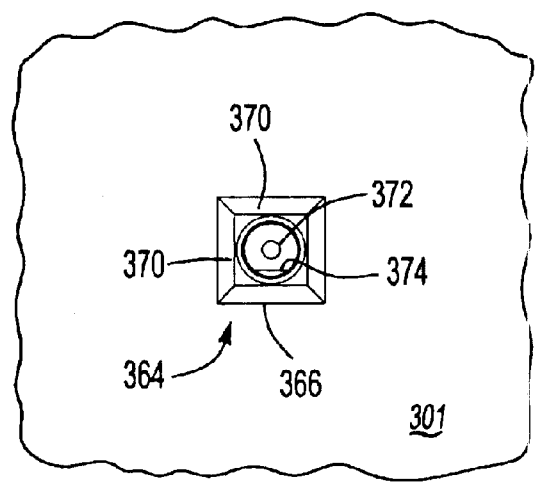
FIG. 31 is an enlarged view of the base unit shown in FIGS. 29 & 30 illustrating the power port in accordance with the invention.
Figure 32:
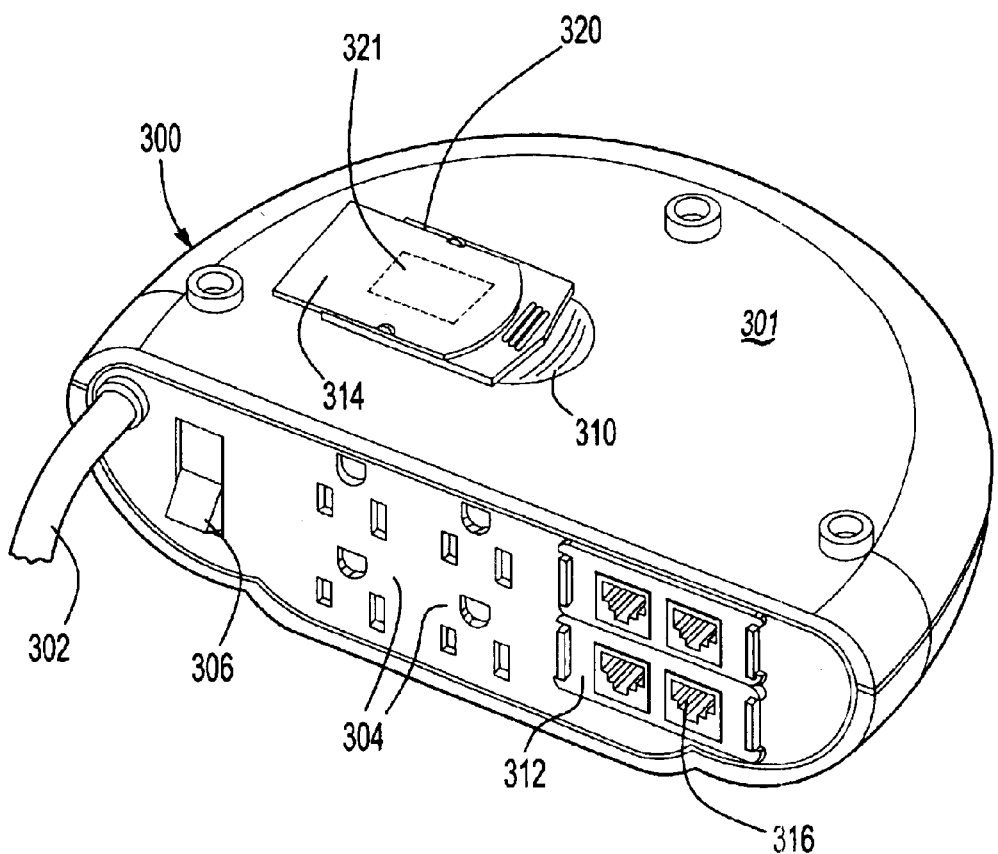
FIG. 32 is a perspective view illustrating the back and bottom of the base unit shown in FIGS. 29 & 30.
Figures 33, 34:
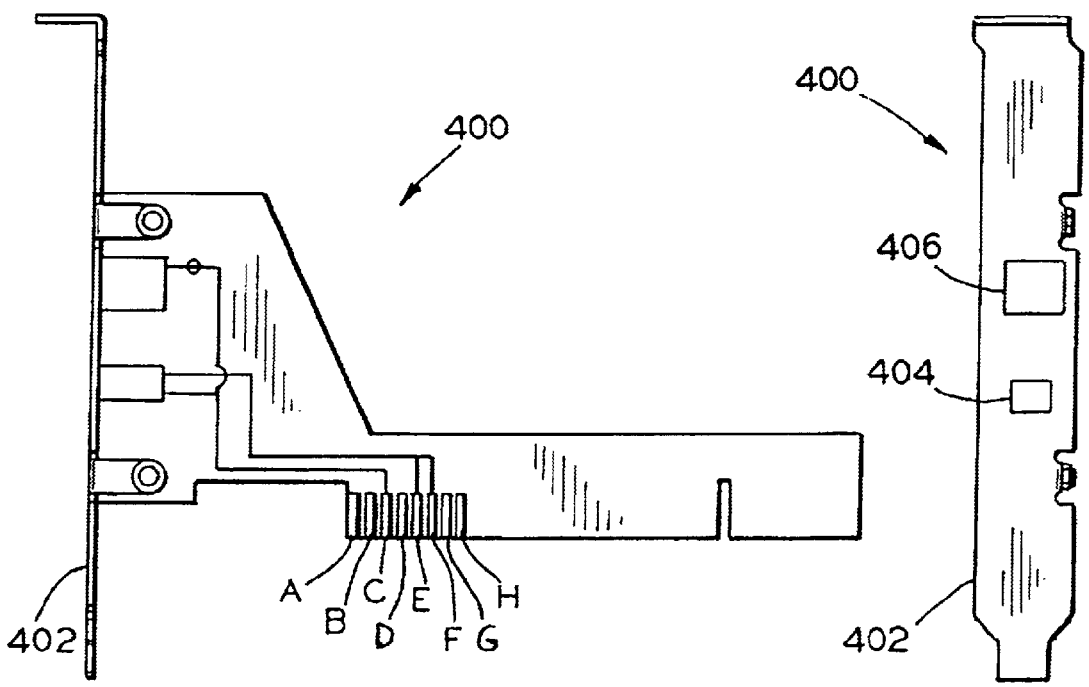
FIG. 33 is a side view illustrating the PCI card in accordance with the invention.
FIG. 34 is a front view of the PCI card shown in FIG. 33.
Figures 35, 36:
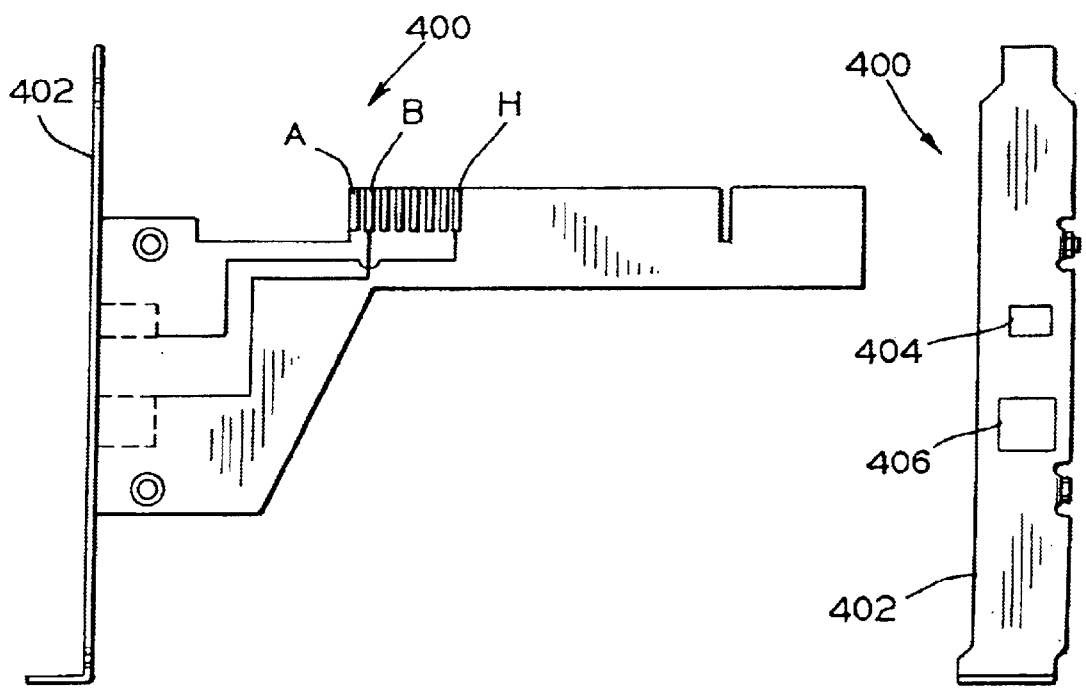
FIG. 35 is a side view illustrating the PCI card shown in FIG. 33.
FIG. 36 is a front view illustrating the PCI card shown in FIG. 35.

The base unit 300 also includes a first or top power port 364 having a first connector 366, a recess 370 and conductors 372 and 374 (as shown in FIG. 31) which are all similar to the first or top power port 264 on the stackable USB hub 240 as described above. The stackable USB hub 240 is mounted directly to the base unit 300 by placing the hub on top of the base unit along an axis of stacking (as shown by arrows 365 in FIG. 29) so that the second connector 246 of the hub second or bottom power port 244 is connected to the first connector 366 of the base first or top power port 364. Any suitable stackable modular component may be mounted to the base unit 300 via the first or top power port 364 as described above.

Figure 30:
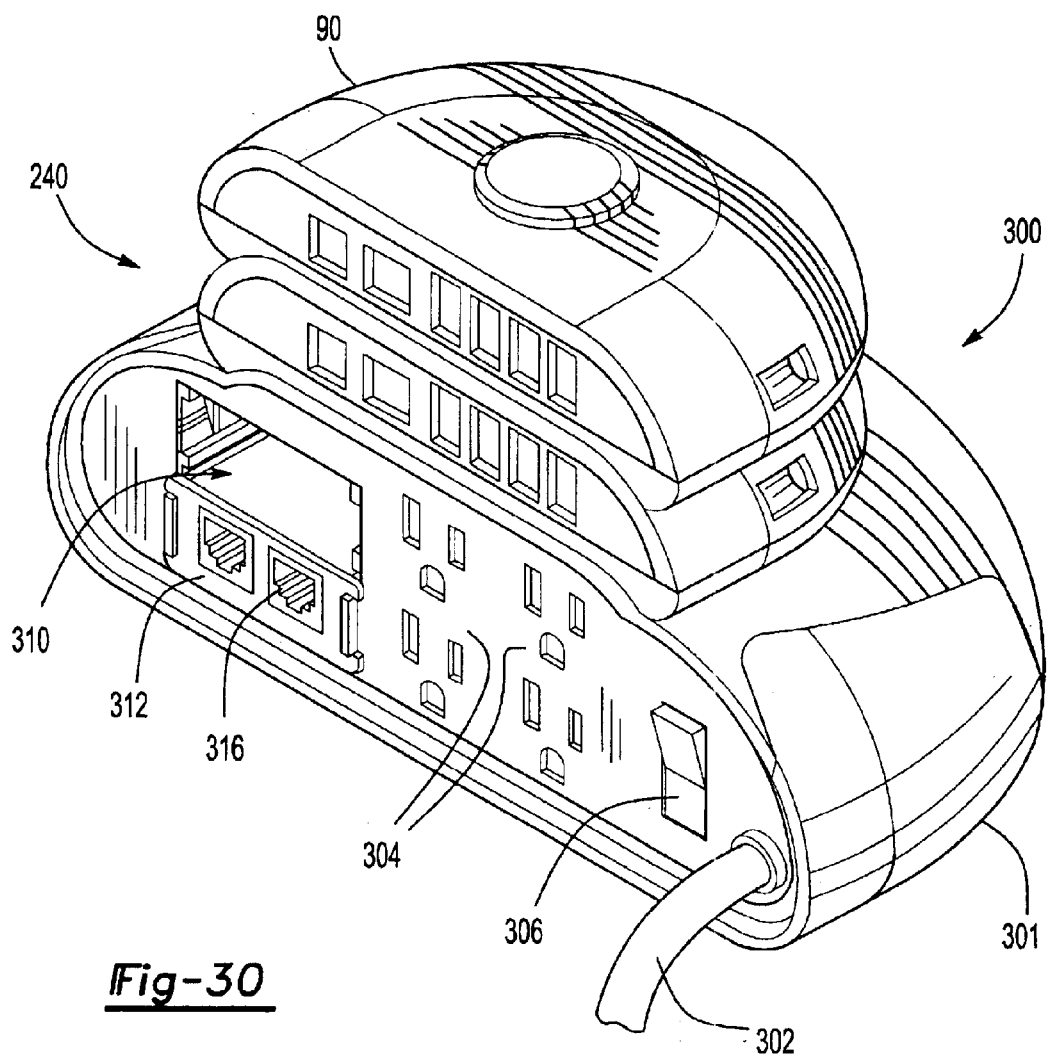
FIG. 30 is a perspective view illustrating the stackable USB hub shown in FIGS. 27 & 28 connected to a similar stackable USB hub and the base unit shown in FIG. 29 in accordance with the invention.
Figure 30A:
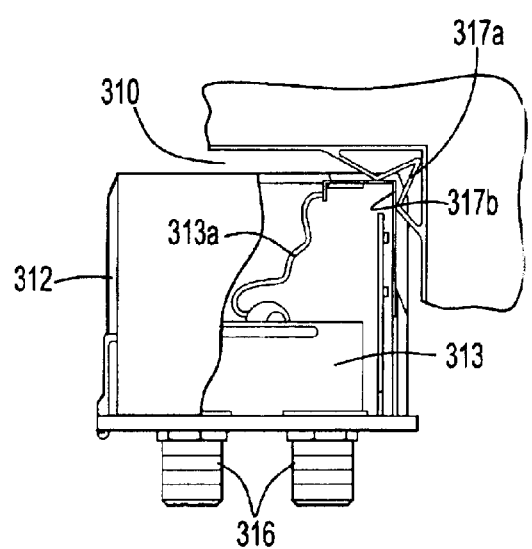
FIG. 30a is a fragmentary top plan view of the top bay shown in FIG. 30 showing how a surge protection module fits in the bay, and how the surge protection circuitry is connected to the base.

As shown in FIG. 30, the housing of each component which may be used as an upstream component includes a raised portion 300A, and the housing of each component which may be used as a downstream component includes a complementary shaped recessed portion 300B for receiving the raised portion of the upstream component thereby improving the fit between the components when mounted together. An optional conventional power connector 243, similar to the connector 118 described above may also be disposed on the housing, 301.

Referring now to FIGS. 33–36, a PCI card is shown generally at 400. The PCI card 400 includes 8 pads or pins labeled A–H which fit into the PCI slot of a conventional computer (not shown). The PCI card 400 also includes a face plate 402 which is accessible to the computer user, typically from the back of the computer, when the card is installed in the computer. The PCI card 400 includes a 5 volt DC connector 404 disposed on the face plate which includes a 5 volt conductor and a ground conductor. The 5 volt conductor is electrically connected to pins E, F and H which receive 5 volts when the card 400 is plugged into the PCI slot. The ground conductor is electrically connected to pin C which receives a ground connection when the card 400 is plugged into the PCI slot. The 5 volt DC connector 404 can be any suitable conventional connector known in the art, but preferably is suitable for connection to the stackable hub power connector 243 described above for providing power to the hub for high power applications.

The PCI card 400 also includes a 12 volt DC connector 406 which is also disposed on the face plate 402. The 12 volt DC connector 404 includes a 12 volt conductor connected to pin B which receive 12 volts when the card 400 is plugged into the PCI slot. The 12 volt DC connector 404 also includes a ground conductor connected to pin C which receives ground when the card 400 is plugged into the PCI slot. The 12 volt DC connector 406 can be any suitable conventional connector known in the art, but preferably is suitable for connection to any suitable electronic component by 1394 firewire connection for providing 12 volt DC power to the component.

Figure 37:
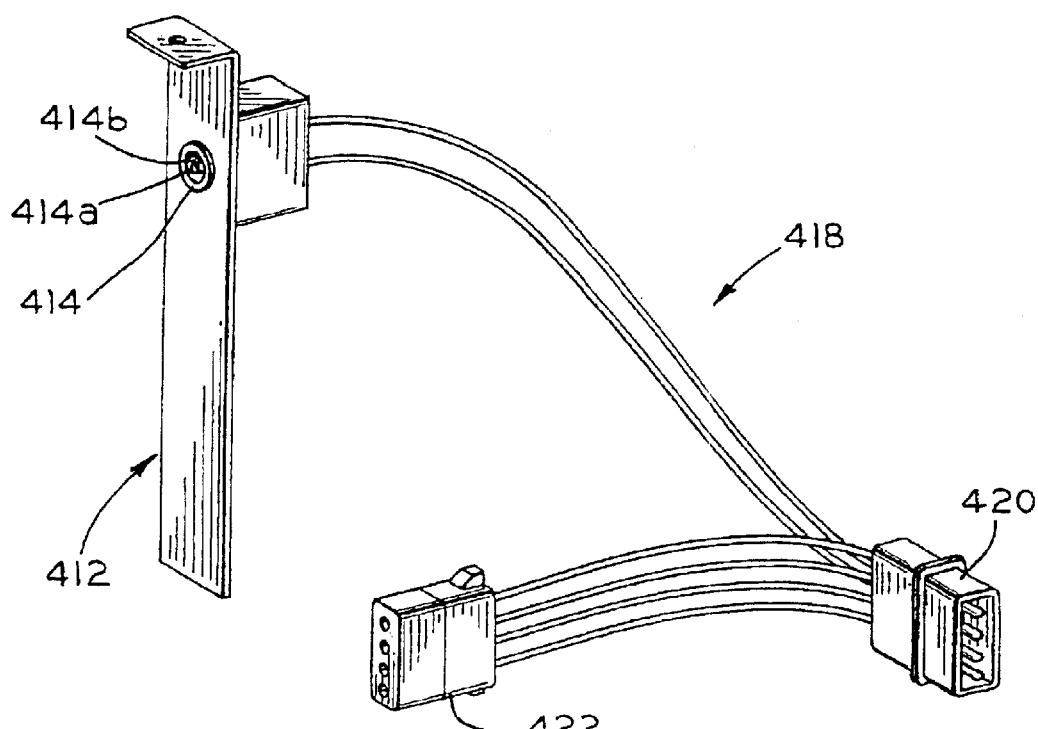
FIG. 37 is a perspective view of an alternate embodiment of the face plate with voltage connector shown in FIG. 34 in accordance with the invention.
Figure 38:
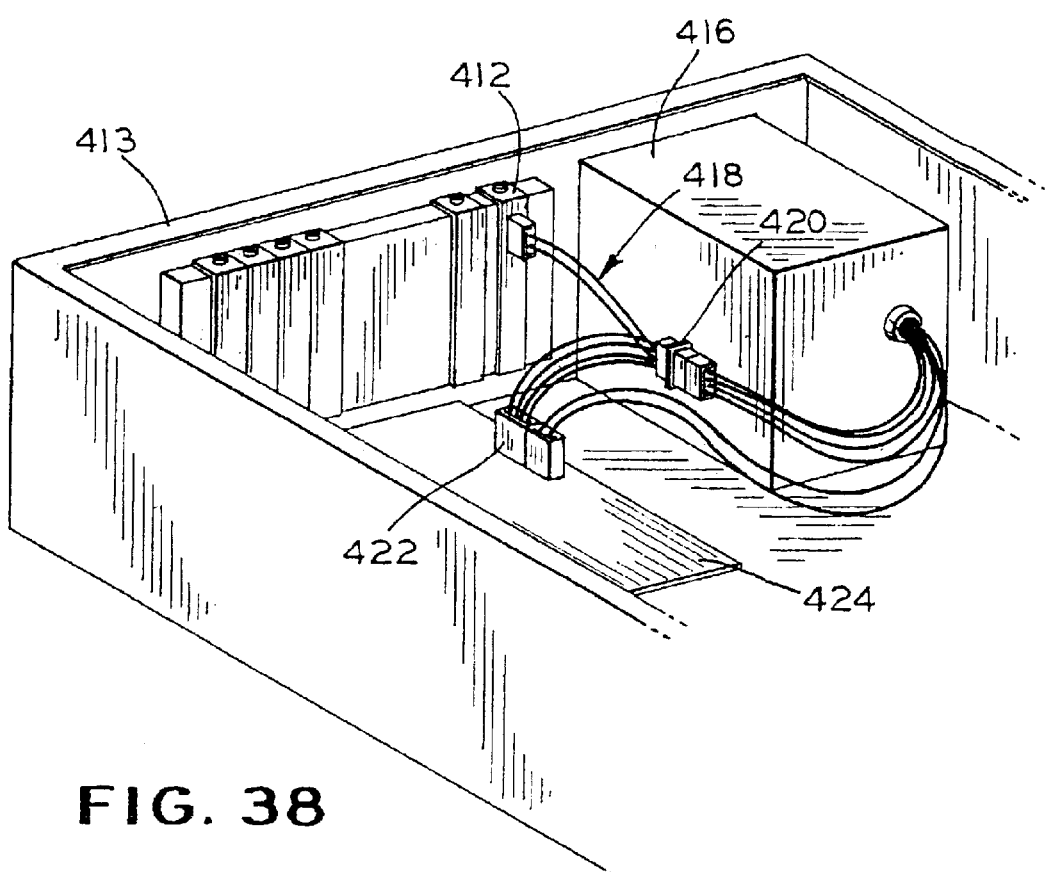
FIG. 38 is a perspective view of the face place with voltage connector shown in FIG. 37 connected to a computer in accordance with the invention.

Referring now to FIGS. 37 & 38, an alternative embodiment of the face plate 402 is shown generally at 412. The face plate 412 is accessible to the computer user, typically from the back of the computer 413 when installed. The face plate 412 includes a known DC voltage connector 414 disposed on the face plate for providing voltage, preferably 5 volts, and ground to any of the hubs or base units described herein. The connector 414 includes a voltage conductor 414a and a ground conductor 414b. The voltage conductor 414a and ground conductor 414b are electrically connected to the power supply 416 via a Y-connector 418. The Y-connector includes suitable known connectors 420 and 422 for connecting between the power supply 416 and any suitable PC board 422 within the computer 424. The Y-connector is also connected to the conductors 414a & 414B for supplying voltage and ground to the conductors 414a, 414b from the computer 413.

Figure 37B:
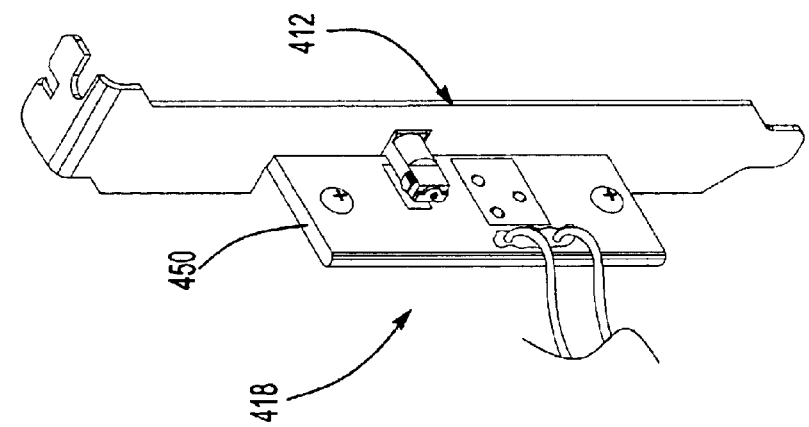
Figure 37A:
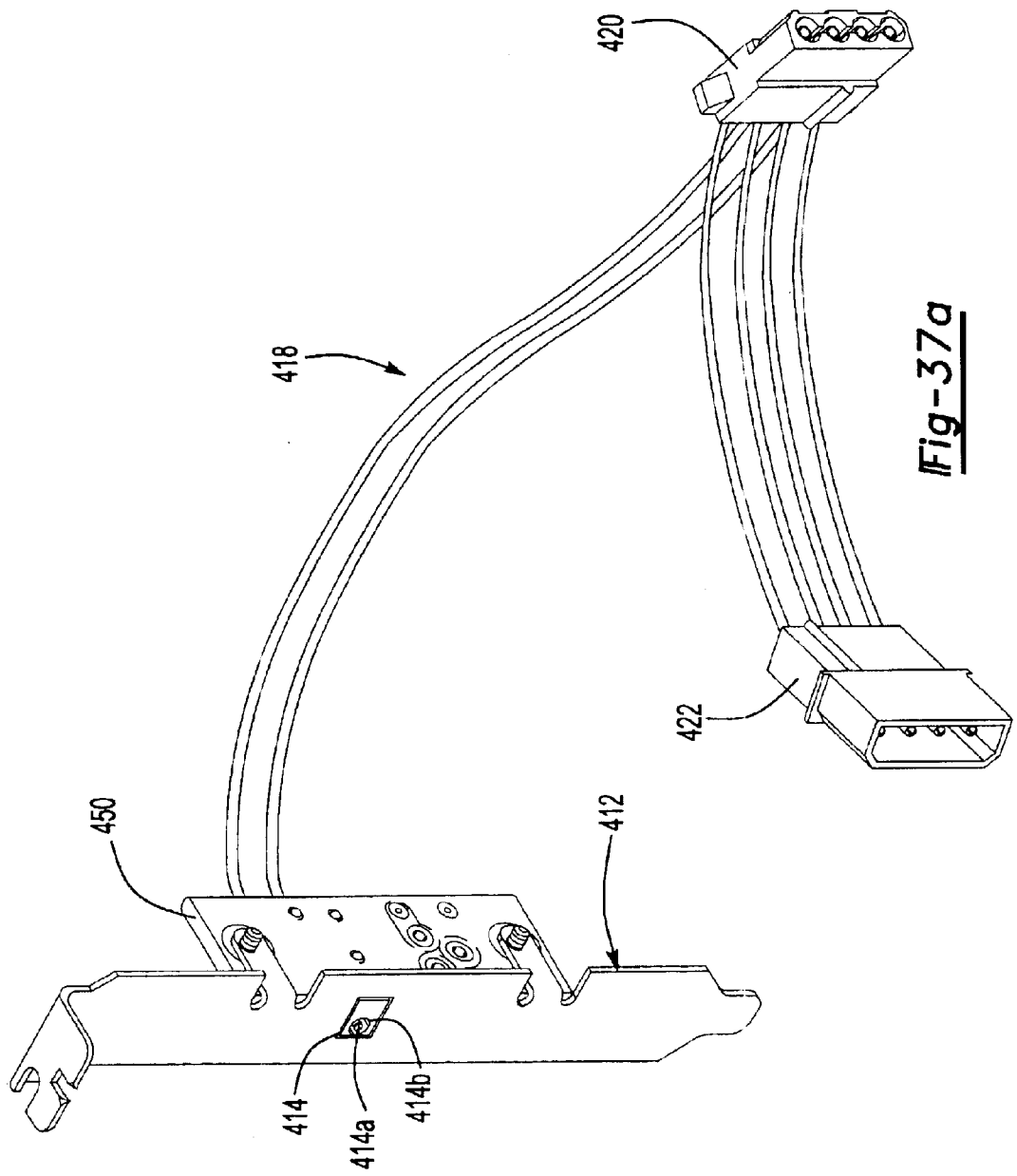
FIG. 37a is a perspective view of a further alternate embodiment of the face plate with voltage connector shown in FIG. 34.

With reference to FIGS. 37a and 37b, a further alternate embodiment of the face plate 402 is shown generally at 450. The operation of the face plate 450 is substantially the same as the face plates 402,412, and the only substantial difference in the construction is that the connector 414 is mounted to a printed circuit board which is fastened to the face plate 450 by any suitable fastenings means, such as screws (not shown).

Figure 39:
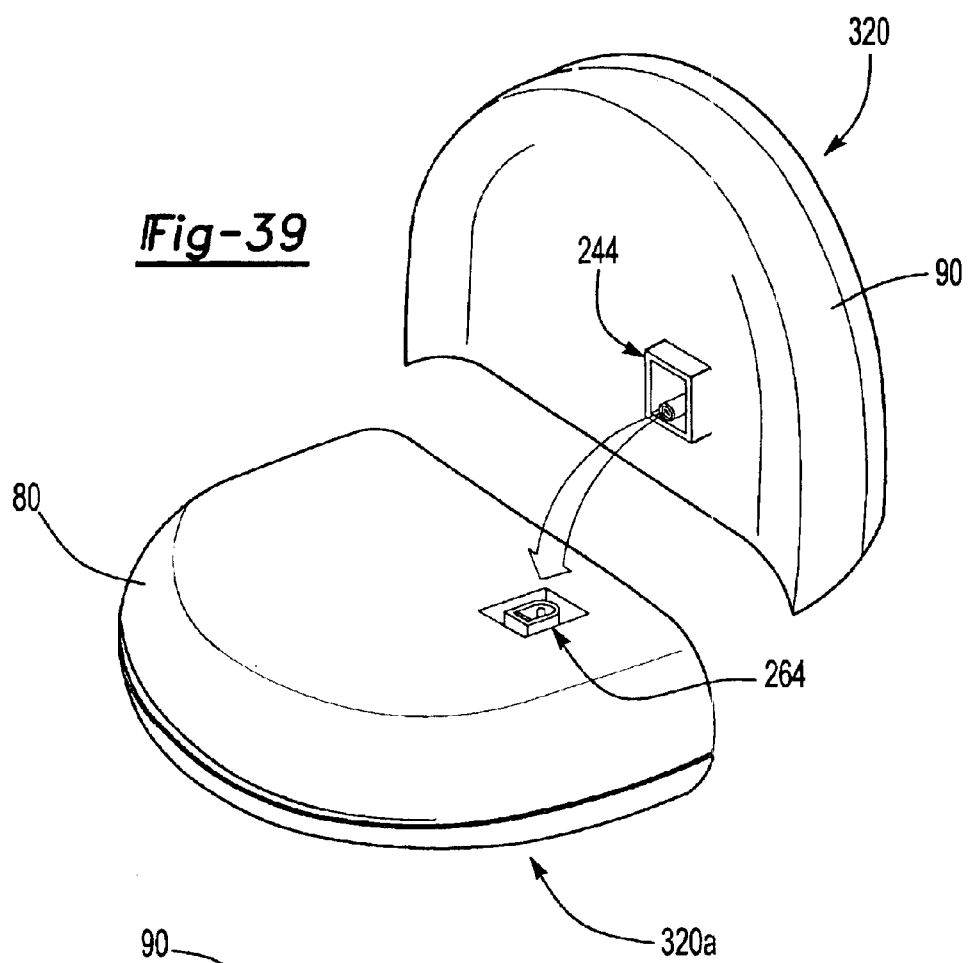
FIG. 39 is a view similar in part to FIGS. 27 & 28, but showing the first or top power port and the second or bottom power port in a different position.

Referring now to FIG. 39, there is shown an exploded view showing a modular stackable component or hub 320 in position to be mounted to another modular stackable component or hub 320A. The construction of stackable hubs 320 is essentially identical to the construction of the stackable USB hubs 240 described in connection with FIGS. 27 and 28, except the first or top power port 264 on the downstream component 80, and the second or bottom power port 244 on the upstream component 90 are shown in a different position. In FIGS. 27 and 28 the first or top power port 264, and the second or bottom power port 244 are shown in a central location (located along the centerline of the hub 240), while in FIG. 39, the ports (244,264) are shown located off to one side of the hubs 320, 320. The hubs have been designated with the numeral 320,320, instead of the numeral 240, as the modular stackable components or hubs 320,320 are not necessarily stackable USB hubs, although they could be.

It can be appreciated by one skilled in the art that the first or top power port 264 on the downstream component 80, and the second or bottom power port 244, on the upstream component 90 may be located at any desired mating positions on the modular stackable component or hubs 320, 320A, and be well within the scope of the present invention.

The hubs 320, 320A are mountable to the base unit 300 in the same manner as the stackable USB hubs 240, and the electrical connections are made in the same manner as hereinabove described.

Figure 40:
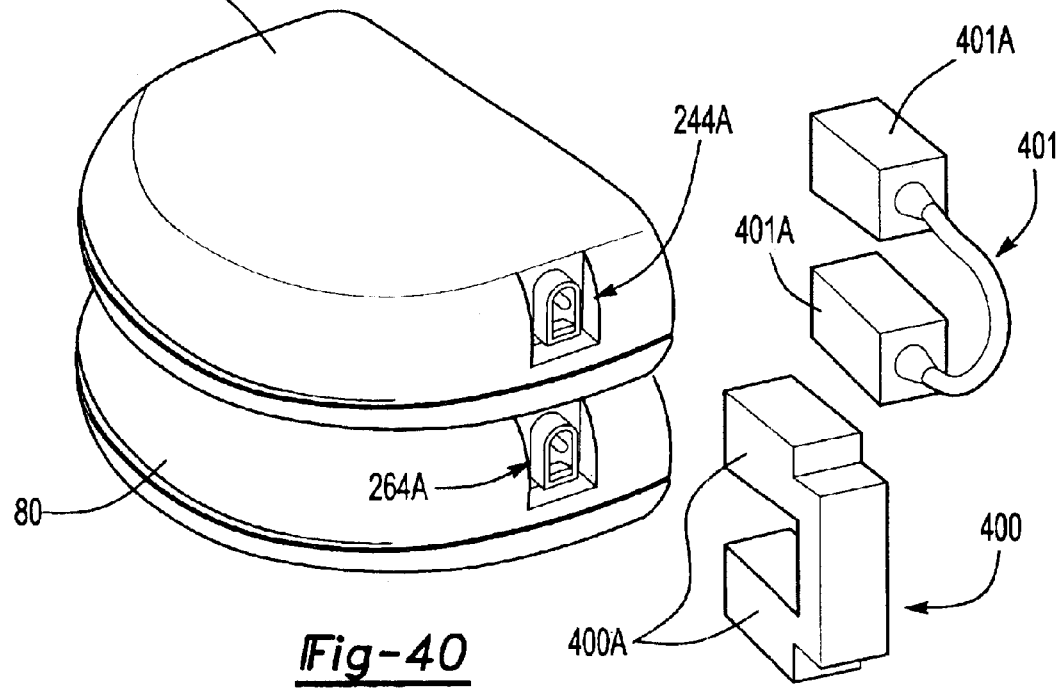
FIG. 40 is a view similar in part to FIG. 39, but showing how the first or top power port and the second or bottom power port may be positioned on the side of the upstream and downstream hubs, and be daisy chained together.

Referring to FIG. 40, it can be seen that the first or top power port 264A on the downstream component 80, and the second or bottom power port 244A on the upstream component 90 may also be placed in contiguous or adjacent positions on the sides of the modular stackable components or hubs 320,320A and be daisy chained together by rigid connector 400 or flexible connector 401.

In this construction, both the first or top power port 264A and the second or bottom power port 244A would have the construction shown and described for the second or bottom power port 244 in FIG. 28, while the connector ends (400A,401A) of the connectors (400,401) would have the construction shown and described in FIG. 27 for the first or top power port 264. Suitable electrical connections would be provided between each of the connector ends 400A on the rigid connector 400 to electrically connect first or top power port 264A and the second or bottom power port 244A.

If flexible connector 401 were used, suitable electrical cable 402 may be used to electrically connect the connector ends 401A of flexible connector 401, thereby providing the necessary electrical connection between first or top power port 244A and second or bottom power port 264A when flexible connector 401A is installed. The construction of the rigid connector 400 may be similar to the construction of the daisy chain connector disclosed in my co-pending provisional application Serial No. 60/382,642, filed May 23, 2002, for Connecting Apparatus and Method for Interconnecting Stackable Electrical Hubs, the specification of which is specifically incorporated by reference.

Figure 41:
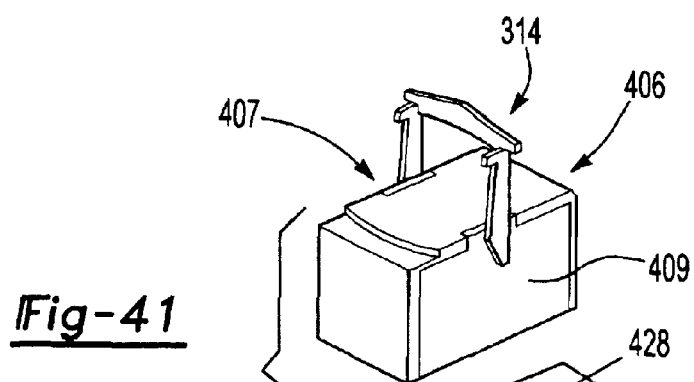
FIG. 41 is an exploded perspective view showing how a removable surge suppression module may be provided in a hub.

With reference to FIG. 41, a bay 405 is provided on modular stackable component or hub 320 to provide for receiving at least one removable module 406, which may be such as a removable hub surge suppression module 407. The construction of removable hub surge suppression module 407 is preferably the same as the removable surge suppressor module 320 provided in the base 300.

Figure 42:
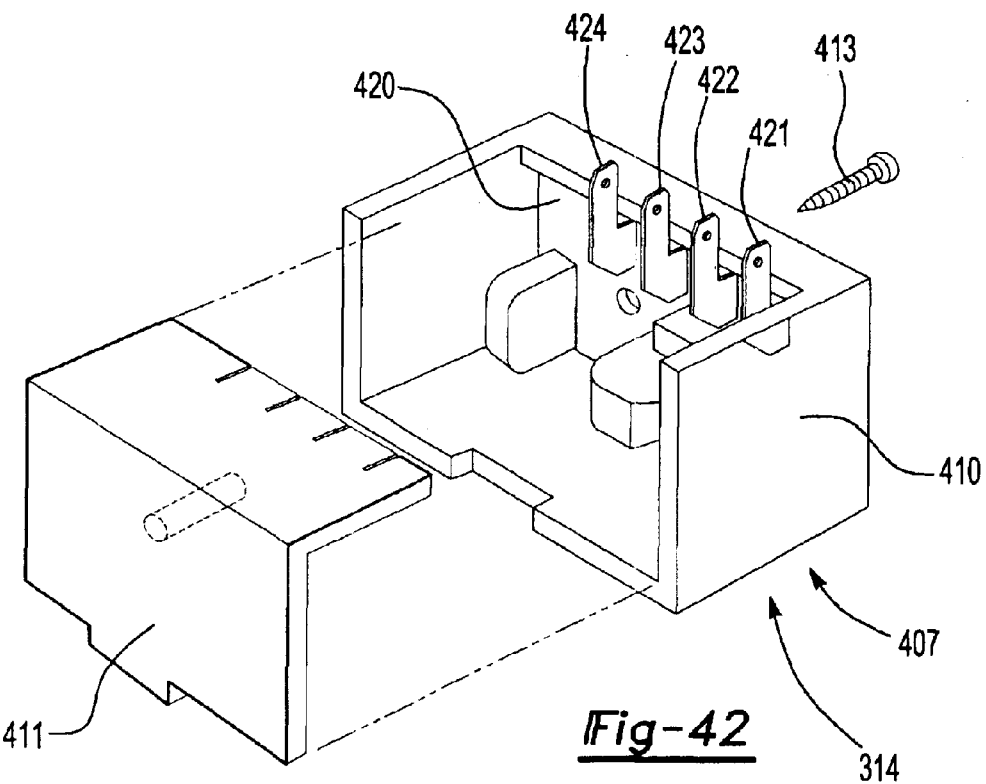
FIG. 42 is an exploded perspective view of the removable surge suppressor illustrated in FIG. 41, from the bottom, showing terminals which will plug into the bay provided in the hub.

The construction of the modules (320,407) is shown in FIG. 42. The modules have a housing 409 comprising at least a first or base portion 411 and a second or cover portion 412. Cover 412 is held to base 411 by any suitable fastening mechanism known in the art, such as screw 413. A printed circuit board 420 carries typical surge suppression circuitry known in the art, and is electrically connected to first male connector 421, second male connector 422, third male connector 423 and a forth male connector 423.

First male connector 421, second male connector 422, third male connector 423 and a forth male connector 423 mate with corresponding first female receptor 425, second female receptor 426, third female receptor 427 and forth female receptor 428 provided on printed circuit board 415.

Figure 43:
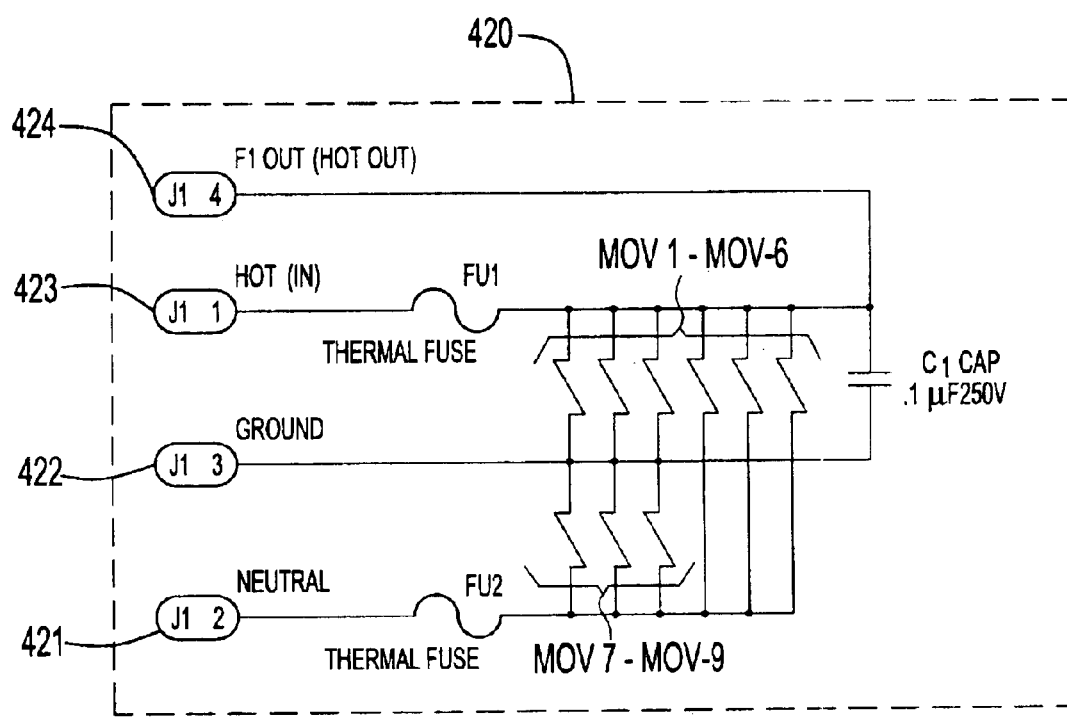
FIG. 43 is an electrical block diagram of surge suppression circuitry which may be used in the removeable surge suppression module of FIGS. 41 & 42.

FIG. 43 shows an electrical block diagram of surge suppression circuitry which may be provided on printed circuit board 420. The exact circuitry may vary depending on the amount of surge suppression needed, and the application. Providing the necessary surge suppression circuitry is well within the capabilities of one of ordinary skill in the electronic art. It should be noted, however, that in the construction shown, because of the provision of third male connector 423 (HOT(IN)), fourth male connector 424 (HOT OUT), associated female receptors (427,428), and the circuitry of circuit board 420, the removable surge protection module (314,407) must be installed before base 300 or modular stackable component or hub 320 may be fully operative.

Figure 44:
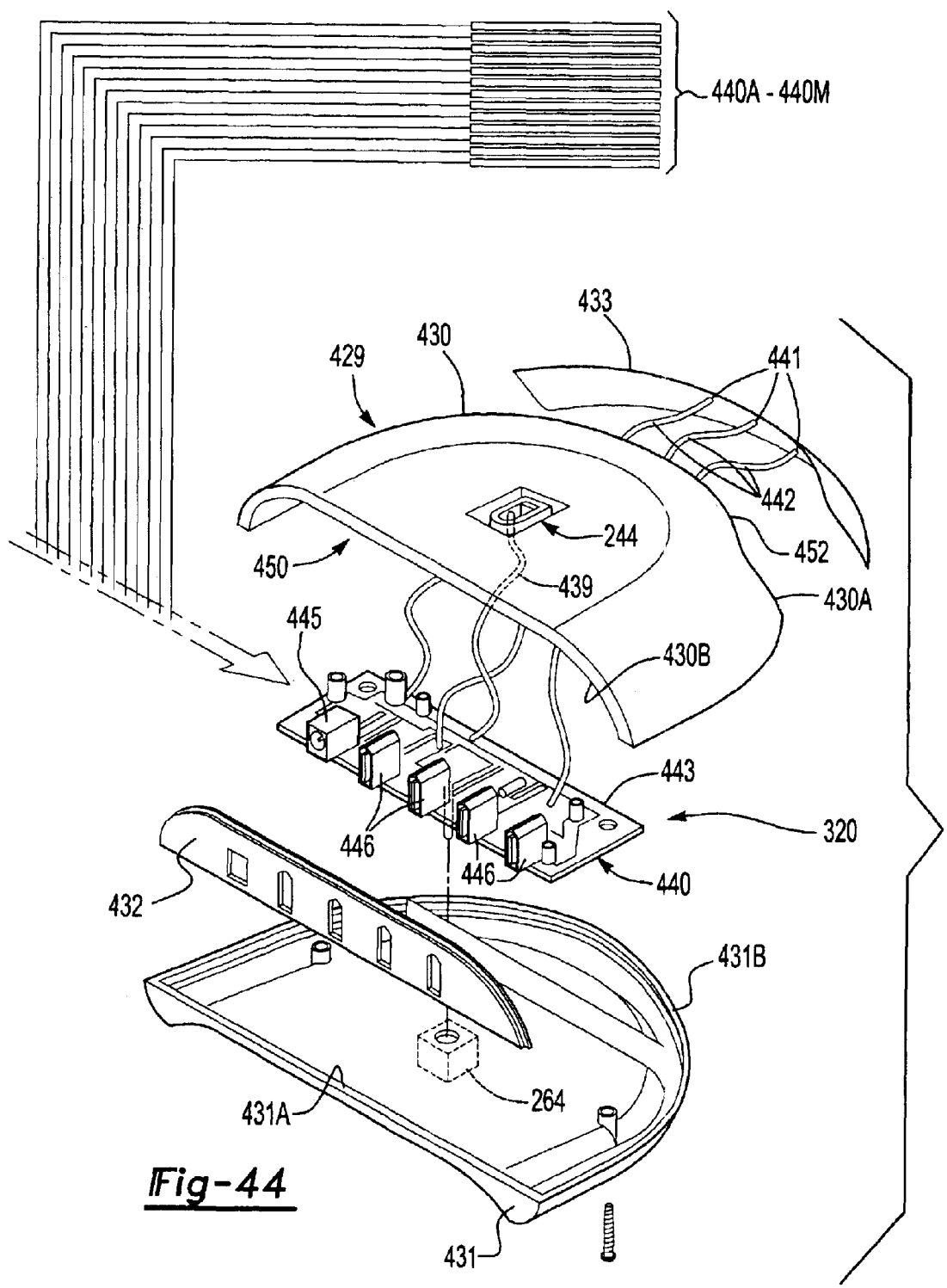
FIG. 44 is an exploded perspective view of one of my modular stackable hubs showing its universal nature, whereby one hub design may be used to provide multiple hub types by providing different circuits therein, aided by an interchangeable housing construction. This embodiment of the present invention may be used, for example, as a fourth alternate embodiment of a stackable USB hub, such as the USB hub described in FIG. 28.

Referring now to FIG. 44, the universal nature of my modular stackable power supply system can be seen. The stackable hub or component, generally designated by the numeral 320, has a housing 429 comprising a first, or top, portion 430, a second, or bottom, portion 431, a third, or back portion 432, and a fourth, or faceplate portion 433. First, or top, portion 430 has a first recess 430A, and a second recess 430B, which will cooperate with second, or bottom, portion 431, to provide openings for mounting third, or back portion 433 and fourth, or faceplate portion, 434 in a manner hereinafter described.

First or top power port 264 will allow connection of any desired number of modular stackable components or hubs 320 to be connected upstream of stackable hub 320. First or top power port 264 may be placed in any desired position on the first, or top, portion 430 of the stackable hub 320. In the preferred embodiment, the first or top power port is placed in a central location. Conductor(s) 439 connect(s) the first or top power port 264 to the circuit 440, which may be in the form of a printed circuit board, a hard wired circuit board, a combination of the two, or any other type of circuit it is desired to put in stackable hub or component 320.

Second or bottom power port 244 supplies power to the stackable hub or component 320 from a base unit 300, or another, downstream hub, as previously described. While heretofore the base unit has been shown as supplying a voltage of 5V DC to the modular stackable components or hubs 320 for use with USB devices, and this is standard in the industry for USB, it should be understood that another desired voltage, such as 12V DC, used with Firewire® devices could be transferred up the stackable power supply system through the first or top and second or bottom power supply ports, 264,244 which form the "core" of the system. While the first or top power supply ports 264 and second or bottom power supply ports 244 could be modified to carry more than one voltage, for example 12V DC and 5V DC, this is not the preferred embodiment of the invention. It is preferred that only one, predetermined, desired voltage be carried up the core of the system. If the circuit 440 needs a different voltage than is being carried through the first or top and second or bottom power supply ports (264,244), either higher or lower, it is well within the scope of the present invention to provide a step up or step down device inside the housing 429 of stackable hub or component 320, and preferably as part of circuit 440, which may contain printed circuit board 443.

The circuit, generally designated by the numeral 440, may be virtually any DC powered device, including, but not limited to, an ISDN modem 440A, a router 440B, a KVM switch 440C, a port replicator 440D, a LAN hub 440E, a cable modem 440F, an Ethernet device 440G, a CDR/DVD Firewire® device 440H, A CD-RW drive 440I, an SCSI converter 440J, a USB hub 440K, A Firewire® hub 440L, a DC power hub 440M, or any other DC powered device.

Because each of the above circuits 440 may have the need for a different number of indicating devices or LED'S 441 connected to the circuit 440 by second conductors 442, the fourth, or faceplate portions 433 of housing 429 are interchangeable with one another so a separate housing, or substantial portion thereof is not needed for each of the DC powered devices or circuits 440, such as 440A–440M. This greatly simplifies the manufacturing process for my stackable power supply system, and reduces costs as well.

Also, since each of the circuits 440 may have the need for a different number of input devices 445, and output devices 446, to be connected to the circuit 440, and which, in the preferred embodiment, are mounted to the circuit board 443, the third, or back portions 432 of housing 429 are interchangeable with one another so a separate housing, or substantial portion thereof is not needed for each of the DC powered devices or circuits 440, such as 440A–440M. This allows for the circuit 440 to have the associated number of input devices 445, and output devices 446, and for the circuit 440 to be easily accommodated by the housing 429 by providing the back portion 432 of the housing 429 with the appropriate number of openings.

It can be appreciated that a particular configuration of the back portion 432, and the faceplate portion 433, may be used for more than one circuit. For example, the faceplate portion 433 illustrated in FIG. 44 has openings for three (3) LED's. This faceplate, since it is interchangeable with other faceplates, may be used for any circuit that requires three LED's. The third, or back portion 432 of housing 429 will be retained in the opening 450 formed by the recess 430B and the back edge 431A of the second, or bottom, portion of housing 429 when housing 429 is assembled. Suitable grooves, ridges, bosses, or other retaining means may be provided in opening 450 if desired. Third, or back, portion 432 of housing 429 may be sonic welded, bonded, or otherwise retained in opening 450 if desired.

Likewise, fourth, or faceplate portion 433 will be mounted in opening 452 formed by first recess 430A, and front edge 431B of the second, or bottom, portion 431 of housing 429, and may similarly retained.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A stackable component comprising:
   a housing having an axis of stacking;
   a circuit disposed within said housing;
   at least one first power port disposed on a first portion of said housing for mounting said component to a upstream stackable component along said axis of stacking, if desired, and for supplying high vower voltage and ground to said upstream-stackable component, wherein said at least one first power port is electrically connected to said circuit; and
   at least one second power port disposed on a second portion of said housing for mounting said stackable component to a downstream stackable component along said axis of stacking, if desired, and for receiving high power voltage and ground from said downstream stackable component, wherein said at least one second power port is electrically connected to said circuit.

2. The stackable component defined in claim 1 further comprising at least one external port disposed on a third portion of said housing for communicating at least a third electrical signal to said circuit.

3. The stackable component defined in claim 1 further comprising at least one bay disposed in said housing for receiving at least one removable module.

4. The stackable component defined in claim 3, wherein said removable module is electrically connected to said circuit.

5. The stackable component defined in claim 3, wherein said removable module comprises a surge protector.

6. The stackable component defined in claim 1, wherein said circuit includes direct current power.

7. The stackable component defined in claim 1, wherein said circuit includes alternating current power.

8. The stackable component defined in claim 1, wherein said circuit includes an ISDN modem.

9. The stackable component defined in claim 1, wherein said circuit includes port replication.

10. The stackable component defined in claim 1, wherein said circuit includes USB to Ethernet conversion.

11. The stackable component defined in claim 1, wherein said circuit includes a router.

12. The stackable component defined in claim 1, wherein said circuit includes KVM switches.

13. The stackable component defined in claim 1, wherein said circuit includes a cable modem.

14. The stackable component defined in claim 1, wherein said circuit includes firewire.

15. The stackable component defined in claim 1, wherein said circuit includes at least one DVD drive.

16. The stackable component defined in claim 1, wherein said circuit includes at least one CD-RW drive.

17. The stackable component defined in claim 1, wherein said circuit includes USB.

18. The stackable component defined in claim 1, wherein said first power port includes a first power port connector, a voltage conductor and ground conductor for supplying said high power voltage and ground from said stackable component to said upstream component to supply the current requirements of said upstream component in high power applications.

19. The stackable component defined in claim 18, wherein said first power port connector includes a boss extending from said housing.

20. The stackable component defined in claim 19 wherein said boss is square shaped.

21. The stackable component defined in claim 1, wherein said second power port includes a second power port connector, a voltage conductor and a ground conductor for receiving said high power voltage and ground from said downstream component connected to said second power port.

22. The stackable component defined in claim 1, wherein said second power port connector includes a recess extending into said housing, said recess being shaped to receive a first power port disposed on said downstream component, wherein said first power port is similar to said first power port disposed on said stackable hub.

23. The stackable component defined in claim 1, wherein said housing comprises:
a) a top portion, and at least a portion of a second opening therein to receive a back portion a top portion having an first or top power port provided therein, at least a portion of an opening therein to receive a faceplate
b) a bottom portion closing said top portion, and together with said at least a portion of an opening therein to receive a faceplate portion and said at least a portion of a second opening therein to receive a back portion, defining an opening to receive a faceplate portion and a second portion to receive a back portion,
c) an interchangeable faceplate portion of said housing mounted in said opening to receive a faceplate portion, and
d.) an interchangeable back portion of said housing mounted in said second opening to receive a back portion.

24. A base unit releasably mountable to a housing of a stackable component, said base unit comprising:
a housing having an axis of stacking;
a circuit disposed within said housing;
at least one outlet for distributing AC power to an electrical component connected thereto, wherein said outlet is electrically connected to said circuit; and
at least one first power port disposed on said housing for removably mounting said base unit to an upstream stackable component along said axis of stacking and for communicating at least one electrical power signal with said upstream stackable component, wherein said first power port is electrically connected to said circuit.

25. The base unit defined in claim 24, and further comprising at least one bay disposed in said housing for receiving at least one removable module.

26. The base unit defined in claim 25, wherein said removable module is electrically connected to said circuit.

27. The base unit defined in claim 25, wherein said removable module comprises a surge protector.

28. The base unit defined in claim 24, wherein said housing comprises:
a) a top portion having an first or top power port provided therein, at least a portion of an opening therein to receive a faceplate portion, and at least a portion of a second opening therein to receive a back portion
b) a bottom portion closing said top portion, and together with said at least a portion of an opening therein to receive a faceplate portion and said at least a portion of a second opening therein to receive a back portion, defining an opening to receive a faceplate portion and a second portion to receive a back portion,
c) an interchangeable faceplate portion of said housing mounted in said opening to receive a faceplate portion, and
d) an interchangeable back portion of said housing mounted in said second opening to receive a back portion.

29. A modular stackable hub system comprising:
a base unit comprising:
a base housing having an axis of stacking;
a base circuit disposed within said base housing;
at least one outlet for distributing AC power to an electrical component connected thereto, wherein said outlet is electrically connected to said base circuit;
at least one first base power port disposed on said base housing and aligned with said axis of stacking for removably mounting said base unit to an upstream stackable hub and for communicating at least a first electrical power
signal with said upstream stackable hub, wherein said first base power port is electrically connected to said base circuit;
at least one stackable hub removably mountable to said first base power port along said axis of stacking comprising:
a hub housing;
a hub circuit disposed within said hub housing;
at least one first hub power port disposed on a first portion of said hub housing for mounting said stackable hub to an upstream stackable component and for communicating at least a second electrical power signal with said upstream stackable component, wherein said first hub power port is electrically connected to said hub circuit; and at least second hub power port disposed on a second portion of said hub housing and mounted to said first base power port and for mounting said stackable hub to a hub downstream stackable component and for communicating at least a third electrical power signal with said hub downstream stackable-component, wherein said second hub power port is electrically connected to said hub circuit.

30. The system defined in claim 29, further comprising at least one bay disposed in said base housing for receiving at least one base removable module.

31. The system defined in claim 30, wherein said base removable module is electrically connected to said base circuit.

32. The system defined in claim 30, wherein said base removable module comprises a surge protector.

33. The system defined in claim 29, further comprising at least one bay disposed in said hub housing for receiving at least one hub removable module.

34. The system defined in claim 33, wherein said hub removable module is electrically connected to said hub circuit.

35. The system defined in claim 33, wherein said hub removable module comprises a surge protector.

36. The system defined in claim 29 wherein said hub circuit includes direct current power.

37. The system defined in claim 29 wherein said hub circuit includes an ISDN modem.

38. The system defined in claim 29 wherein said hub circuit includes port replication.

39. The system defined in claim 29 wherein said hub circuit includes USB to Ethernet conversion.

40. The system defined in claim 29 wherein said hub circuit includes a router.

41. The system defined in claim 29 wherein said hub circuit includes KVM switches.

42. The system defined in claim 29 wherein said hub circuit includes a cable modem.

43. The system defined in claim 29 wherein said hub circuit includes firewire.

44. The system defined in claim 29 wherein said hub circuit includes a DVD drive.

45. The system defined in claim 29 wherein said hub circuit includes CDRW drives.

46. The system defined in claim 29 wherein said hub circuit includes USB.

47. The system defined in claim 29 wherein said second hub power port includes a power port connector, a voltage conductor and ground conductor for receiving voltage and ground from said base unit to supply high current requirements of said hub in high power applications.

48. The system defined in claim 47, wherein said second hub power port connector includes a boss extending from said stackable hub housing.

49. The system defined in claim 48, wherein said boss is square shaped.

50. The system defined in claim 47, wherein each of said first power ports includes a power port connector, voltage conductor and ground conductor for sending voltage and ground an upstream stackable component.

51. The system defined in claim 50, wherein said each power port connector of said first power ports includes a recess extending into respective said stackable housing, said recess being shaped to receive a port disposed on said stackable components, wherein said port is similar to said second hub power port disposed on said stackable hub.

* * * * *